(12) United States Patent
Murakoshi

(10) Patent No.: US 7,587,593 B2
(45) Date of Patent: Sep. 8, 2009

(54) ELECTRONIC DEVICE AND METHOD FOR UPDATING AUTHENTICATION REFERENCE INFORMATION

(75) Inventor: Sho Murakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 716 days.

(21) Appl. No.: 10/887,978

(22) Filed: Jul. 12, 2004

(65) Prior Publication Data

US 2005/0050321 A1 Mar. 3, 2005

(30) Foreign Application Priority Data

Jul. 24, 2003 (JP) ............................. 2003-278873

(51) Int. Cl.
*H04L 29/06* (2006.01)

(52) U.S. Cl. ...................... 713/165; 380/229; 713/170; 711/117; 726/21

(58) Field of Classification Search ................ 713/165, 713/170; 711/117, 148, 150; 380/229, 232; 705/67; 726/21
See application file for complete search history.

(56) References Cited

U.S. PATENT DOCUMENTS

| | | | | |
|---|---|---|---|---|
| 4,779,193 A | * | 10/1988 | Koga et al. ................... 711/118 |
| 4,916,658 A | * | 4/1990 | Lee et al. ...................... 711/100 |
| 5,761,166 A | * | 6/1998 | Sedlmayr et al. ............... 360/69 |
| 6,061,449 A | * | 5/2000 | Candelore et al. .............. 380/28 |
| 6,137,716 A | * | 10/2000 | Wik ........................ 365/185.01 |
| 6,587,581 B1 | * | 7/2003 | Matsuyama et al. .......... 382/149 |
| 6,748,488 B2 | * | 6/2004 | Byrd et al. ................... 711/114 |
| 6,954,859 B1 | * | 10/2005 | Simerly et al. .................. 726/3 |
| 2003/0070042 A1 | * | 4/2003 | Byrd et al. .................... 711/114 |
| 2004/0071293 A1 | * | 4/2004 | Yamamichi et al. ......... 380/277 |
| 2004/0148555 A1 | * | 7/2004 | Blackburn et al. ........... 714/747 |
| 2006/0053459 A1 | * | 3/2006 | Simerly et al. .............. 725/105 |

FOREIGN PATENT DOCUMENTS

| | | |
|---|---|---|
| EP | 0 930 556 A2 | 7/1999 |
| EP | 1 235 390 A1 | 8/2002 |
| JP | 09006660 A * | 1/1997 |

OTHER PUBLICATIONS

Digital Transmission Content Protection Specification Revision 1.2 (Information Version), Jul. 11, 2001.*
Digital Transmission Content Protection Specification Revision 1.2a (Information Version), Feb. 25, 2002.*
"5C Digital Transmission Content Protection White Paper", URL, http://www.dtcp.com/data/wp_spec.pdf, Jul. 14, 1998, Revision 1.0, pp. 1-15.
5C Digital Transmission Content Protection White Paper, 1998, URL, http://www.dtcp.com/data/wp_spec.pdf.

* cited by examiner

*Primary Examiner*—Kimyen Vu
*Assistant Examiner*—April Y Shan
(74) *Attorney, Agent, or Firm*—Oblon, Spivak, McClelland, Maier & Neustadt, P.C.

(57) ABSTRACT

Authentication reference information (SRM) is input into a variety of input paths, thereby increasing the opportunity to update the authentication reference information. Then, the authentication reference information input from each input path is temporarily buffered. After checking the validity or the version of the information, the authentication reference information is used for updating older authentication reference information, thereby preventing unnecessary or unsuitable updating.

12 Claims, 34 Drawing Sheets

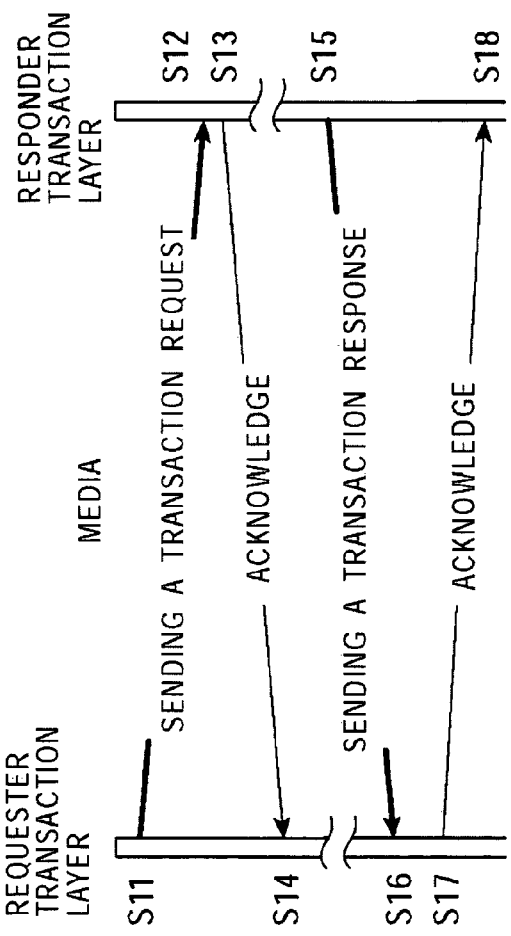

| SENDING A TRANSACTION REQUEST | SENDING A TRANSACTION RESPONSE |
|---|---|
| WRITE REQUEST (DATA QUADLET) | WRITE RESPONSE |
| WRITE REQUEST (DATA BLOCK: DATA LENGTH = 4BYTES) | WRITE RESPONSE |
| WRITE REQUEST (DATA BLOCK: DATA LENGTH ≠ 4BYTES) | NO RESPONSE (UNIFIED TRANSACTION) |
| READ REQUEST (DATA QUADLET) | READ RESPONSE (DATA QUADLET) |
| READ REQUEST (DATA BLOCK: DATA LENGTH = 4BYTES) | READ RESPONSE (DATA BLOCK) |
| READ REQUEST (DATA BLOCK: DATA LENGTH ≠ 4BYTES) | READ RESPONSE (DATA BLOCK) |
| LOCK REQUEST | LOCK RESPONSE |

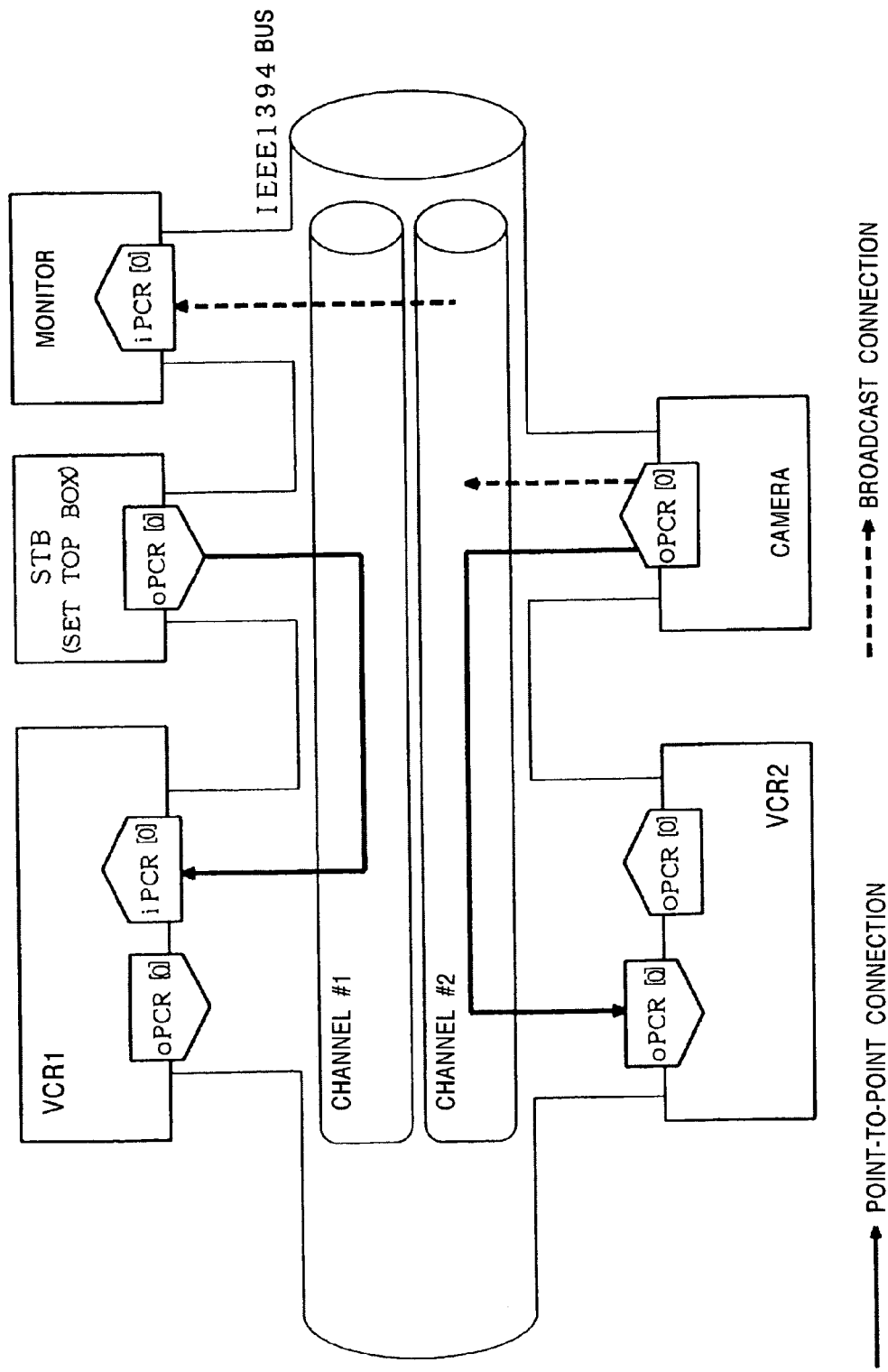

● OUTPUT PLUG CONTROL REGISTER oPCR [n]

● INPUT PLUG CONTROL REGISTER iPCR [n]

FIG. 19

CTYPE/RESPONSE

| | | |
|---|---|---|
| COMMAND | 0000 | CONTROL |
| | 0001 | STATUS |
| | 0010 | INQUIRY |
| | 0011 | NOTIFY |
| | 0100 ⟨ 0111 | (RESERVED) |
| RESPONSE | 1000 | NOT IMPLEMENTED |
| | 1001 | ACCEPTED |
| | 1010 | REJECTED |
| | 1011 | IN TRANSITION |
| | 1100 | IMPLEMENTED/STABLE |
| | 1101 | CHANGED |
| | 1110 | (RESERVED) |
| | 1111 | INTERIM |

FIG. 22

SRM

| TYPE | GENERATION | RESERVE | VERSION NUMBER | | |
|---|---|---|---|---|---|
| | CRL LENGTH | | CRL | | |
| | | | DIGITAL SIGNATURE (DTLA SIGNATURE) | | |

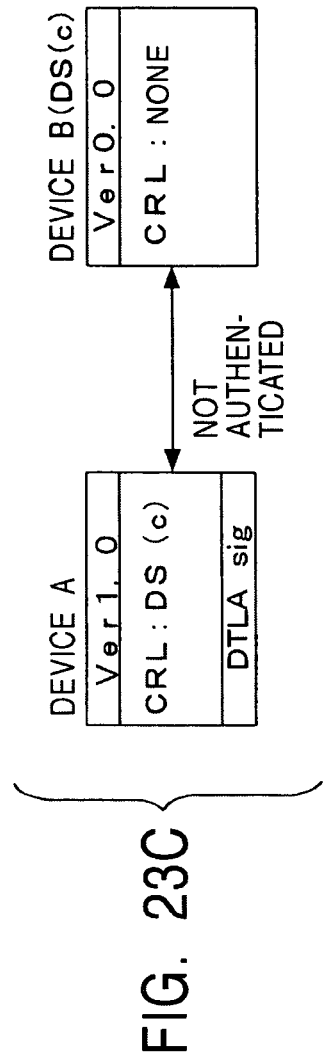
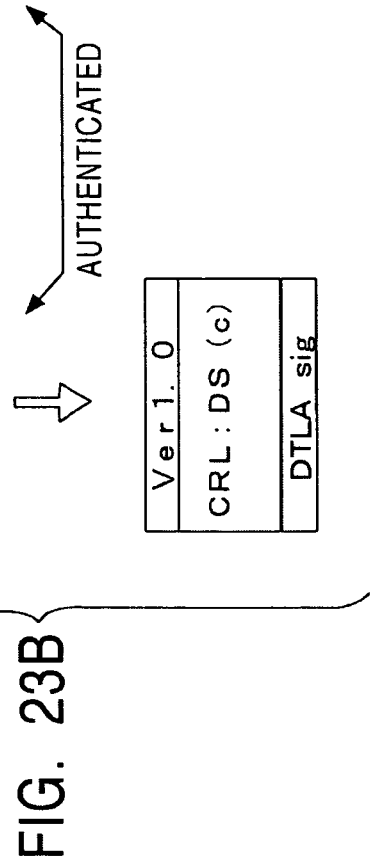
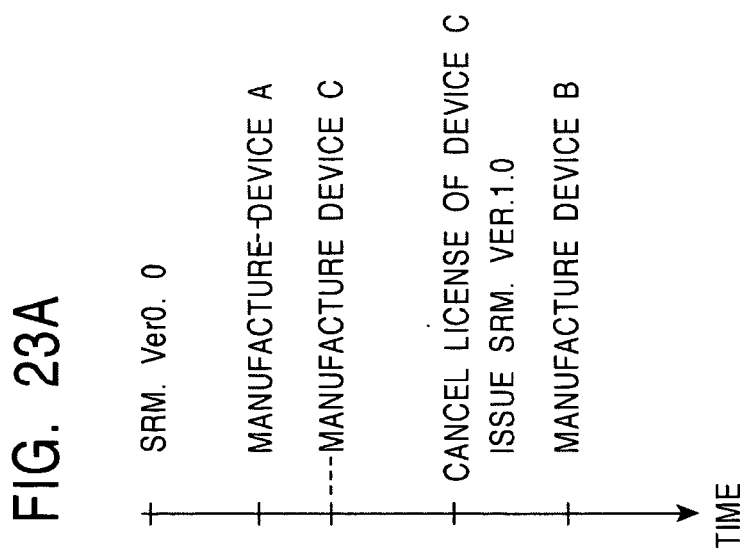
FIG. 23A
FIG. 23B
FIG. 23C

ELECTRONIC DEVICE AND METHOD FOR UPDATING AUTHENTICATION REFERENCE INFORMATION

BACKGROUND OF THE INVENTION

1. Field of the Invention

The present invention relates to an electronic device that establishes a connection and communication state with an external electronic device via a data bus compliant with a predetermined communication format. The invention also relates to a method for updating authentication reference information when performing authentication processing by the above type of electronic device with an external electronic device.

2. Description of the Related Art

As digital data interfaces, IEEE1394 data interfaces are known. IEEE1394 data interfaces have a higher data transfer rate than, for example, small interface computer system interfaces (SCSI), and implements isochronous communication that ensures periodic transmission and reception of a required data size. Accordingly, IEEE1394 data interfaces are effective in transferring stream data, for example, AV (audio/video) stream data, in real time.

In view of the above-described background art, the following type of AV system has been proposed. Electronic devices, for example, various types of digital AV machines or personal computers, are connected with each other via a data bus compliant with prescribed data interface standards, for example, IEEE1394, so that AV data can be transmitted and received between the devices.

As the above-described AV system, the following type of system, a so-called "component AV system", can be considered. An amplifier device is used as the main device, and various AV source output devices, for example, a compact disc (CD) player, a digital versatile disk (DVD) player, a video machine, are connected to the amplifier device via a data bus.

The amplifier device used in the above type of AV system serves the function of receiving AV source information transmitted from source devices via a data bus and of outputting the source information as an audio signal to a speaker. That is, the amplifier device has the function of selecting one of a plurality of source devices connected to a data bus (such a function is also referred to as an "input source selecting function". This function is implemented by establishing a logical and mutual connection with a source device selected by the user.

Due to the developments of AV machines and data network systems, as described above, copying and transmission of digital data is becoming very easy, and thus, copyright protection for digital data content, for example, music and video, is becoming very important.

For conducting copyright protection for content data, various types of techniques, for example, data encryption, authentication between devices when connecting with each other, revocation of unsuitable devices in terms of copyright protection, have been proposed and put to practical use.

For example, Japanese Unexamined Patent Application Publication No. 11-259971 discloses a technique for conducting authentication for copyright protection.

When connecting devices by the above-described IEEE1394 interface, in particular, between devices for transmitting and receiving audio data or video data, data transmission is conducted after authenticating the devices with each other (for example, authenticating the devices as licensed devices provided with an authenticated copyright protection function).

For conducting the above authentication processing, predetermined information (hereinafter referred to as "authentication reference information") is used. This authentication reference information is stored in each device, and it should be updated occasionally when authentication conditions are changed or so-called blacklist information indicating unsuitable devices is added.

Accordingly, each electronic device must update authentication reference information.

To allow each electronic device to effectively exhibit a copyright protection function, authentication reference information must be updated to the latest version as quickly as possible. It is thus preferable that the opportunity to input authentication reference information into each electronic device be increased. That is, by inputting authentication reference information in various input modes, the opportunity to update authentication reference information in each electronic device is increased.

However, due to a variety of input modes, update processing in a device may be confused when, for example, different types of authentication reference information are input into a plurality of paths, or older versions of authentication reference information may be input. Thus, if authentication reference information stored in a device is updated merely in response to the input of authentication reference information, update processing cannot be suitably performed.

SUMMARY OF THE INVENTION

Accordingly, in view of the above background, it is an object of the present invention to enable an electronic device to store the latest authentication reference information by increasing an opportunity to input authentication reference information, and also to perform suitable update processing.

In order to achieve the above object, the present invention provides an electronic device including: a communication unit for communicating with an external electronic device connected to the electronic device via a data bus; an authentication unit for establishing a communication state by conducting authentication processing with the external electronic device connected by the communication unit; a storage unit for storing authentication reference information used in the authentication processing; an input unit for inputting the authentication reference information; a buffer memory device for storing the authentication reference information input from the communication unit and from the input unit according to each of input paths; and an update controller for checking content of the authentication reference information stored in the buffer memory device and for updating the authentication reference information stored in the storage unit by the checked authentication reference information as new authentication reference information according to a result of checking.

In this case, the update control unit may check the validity of the content of the authentication reference information stored in the buffer memory device.

The update control unit may check version information of the content of the authentication reference information stored in the buffer memory device.

The input unit may include a reader for a recording medium, and inputs the authentication reference information read from the recording medium.

The input unit may include a communication unit that can communicate with an external electronic device connected by using a communication format which is different from a predetermined communication format of the communication unit, and inputs the authentication reference information transmitted from the external electronic device.

The input unit may include a radio signal receiver for receiving and inputting the authentication reference information transmitted from an external device by radio.

The electronic device may further include a transmitter for transmitting information to an external electronic device. When updating the authentication reference information stored in the storage device by the authentication reference information stored in the buffer memory device as new authentication reference information, the update controller may transmit the new authentication reference information to the external electronic device by using the transmitter.

The present invention also provides a method for updating authentication reference information used for conducting authentication processing with an external electronic device connected via a data bus by using a predetermined communication format so as to establish a communication state with the external electronic device. The method includes: a buffering step of buffering the authentication reference information input from various input paths according to each of the input paths; a checking step of checking the content of the buffered authentication reference information; and an updating step of updating the authentication reference information used for conducting the authentication processing by the buffered authentication reference information as new authentication reference information according to a result of checking.

The updating step may check the validity of the content of the buffered authentication reference information.

The checking step may check version information of the content of the buffered authentication reference information.

One of the input paths may be an input path into which the authentication reference information read from a recording medium is input.

One of the input paths may be an input path to which the authentication reference information is transmitted from an external electronic device connected by using a communication format which is different from the predetermined communication format.

One of the input paths may be an input path for receiving and inputting the authentication reference information transmitted from an external electronic device by radio.

When updating the authentication reference information used for conducting the authentication processing by the buffered authentication reference information as new authentication reference information, the new authentication reference information may be transmitted to the external electronic device.

Authentication reference information (SRM) is input in the form of a variety of input modes (input means and input paths, thereby increasing the opportunity to update the authentication reference information. Then, the authentication reference information input from each input path is temporarily buffered. After checking the validity or the version of the information, the authentication reference information is used for updating older authentication reference information, thereby preventing unnecessary or unsuitable updating.

Accordingly, in the electronic device, authentication reference information, such as SRM, can be suitably and quickly upgraded, thereby conducting authentication for copyright protection. In other words, in the electronic device, a suitable copyright protection function can always be implemented.

Authentication reference information read from a recording medium can be input into the electronic device. This enables an issuer for authentication reference information to record the authentication reference information on a recording medium, for example, a disk, on which music or image content is recorded, thereby increasing the opportunity to update the authentication reference information. At the same time, the electronic device can update the authentication reference information when playing back the recording medium.

A recording medium, for example, a disk, an integrated circuit (IC) card, or a memory card, specially used for updating authentication reference information can be provided to the electronic device, and the electronic device can read and update the authentication reference information.

That is, by providing authentication reference information in the form of recording media, the opportunity to update the authentication reference information can be increased.

Authentication reference information can be input from an external electronic device connected with the electronic device by using a communication format, which is different from a predetermined format for conducting authentication. This also increases the opportunity to update authentication reference information.

As stated above, authentication reference information can be provided by using a communication format other than the predetermined communication format for conducting authentication. For example, as a writer for writing and transmitting authentication reference information to the electronic device, the communication format of the writer is not restricted. Accordingly, many types of existing writers can be used, and the flexibility to design and/or manufacture the writer can be increased.

Also, to receive and input authentication reference information transmitted from an external device by radio, the opportunity to update the information is increased in the electronic device. In this case, the writer can output authentication reference information by infrared, radio, or broadcasting.

When shipping products, authentication reference information can be easily and efficiently written into the products. Accordingly, it is not necessary to use a personal computer compatible with an IEEE1394 bus for writing authentication reference information, such as SRM data. Thus, a greater variety of writers and more efficient writing operation can be implemented. For example, authentication reference information can be written into many devices by a radio writer, or a disk recording authentication reference information thereon is installed in the electronic device. Accordingly, the provision of a writer is not required.

When updating authentication reference information in the electronic device, the updated new version of authentication reference information can be input into peripheral external devices. That is, the electronic device serves as a writer for authentication reference information. This enables the peripheral external devices to simultaneously update the version. Thus, suitable copyright protection can be implemented.

BRIEF DESCRIPTION OF THE DRAWINGS

FIGS. 12A and 12B illustrate basic communication rules (transaction rules) in asynchronous communication;

FIG. 15 illustrates a connection relationship defined by a plug;

FIG. 19 illustrates the definition of ctype/response of an asynchronous packet;

FIG. 22 illustrates content of SRM data;

FIG. 23 illustrates the use of SRM when conducting authentication;

DESCRIPTION OF THE PREFERRED EMBODIMENTS

The present invention is described in detail below with reference to the accompanying drawings through illustration of preferred embodiments.

Embodiments of the present invention are described in the following order.

1. AV system
    1-1 Overall configuration
    1-2 STR (front panel)
    1-3 STR-compatible disk drive (front panel)
    1-4 STR (internal configuration)
    1-5 STR-compatible disk drive (internal configuration)
2. IEEE1394 data communication in this embodiment
    2-1 Overview
    2-2 Stack model
    2-3 Signal transmission mode
    2-4 Bus connection between devices
    2-5 Packets
    2-6 Transaction rules
    2-7 Addressing
    2-8 Common Isochronous Packets (CIP)
    2-9 Connection management
    2-10 Commands and responses in FCP
    2-11 AV/C command packets
3. SRM
4. SRM input/update processing
    4-1 Input/update processing system configuration
    4-2 Initializing processing
    4-3 SRM input processing
    4-4 SRM update processing
    4-5 Examples of SRM input paths
    4-6 SRM sending processing when being updated 1. AV System
    1-1 Overall Configuration FIG. 1 illustrates an example of the configuration of an electronic device system including a receiving apparatus according to an embodiment of the present invention.

This electronic device system (AV system) is constructed by connecting a plurality of AV machines by a data bus, i.e., an IEEE1394 interface, so that they can communicate each other.

Figure 1:
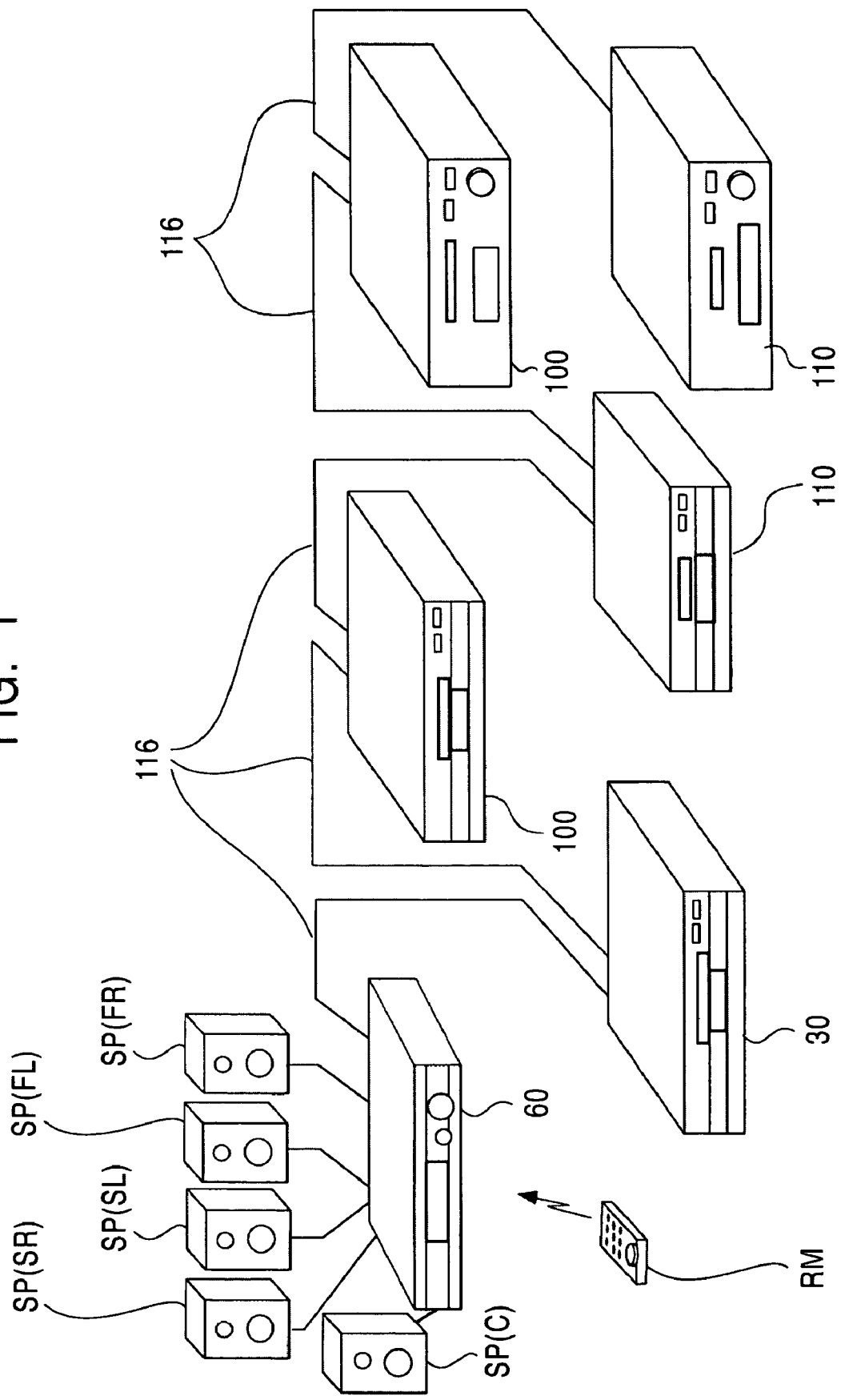
FIG. 1 is a schematic diagram illustrating the configuration of an AV system according to an embodiment of the present invention.

In FIG. 1, a stereo tuner receiver (STR) 60, an STR-compatible disk drive (hereinafter sometimes simply referred to as the "disk drive") 30, first devices 100 manufactured by the same manufacturer as the STR 60 and the disk drive 30, and second devices 110 manufactured by a different manufacturer from that of the STR 60 and the disk drive 30.

The STR 60 serves as the main device of the AV system shown in FIG. 1, and has main functions, such as a tuner function, an external source input selection function, and an amplifier function. The STR 60 can be connected to, for example, speakers for outputting five-channel stereo sound, i.e., a front left channel speaker SP(FL), front right channel speaker SP(FR), surround left channel speaker SP(SL), surround right channel speaker SP(SR), and a center channel speaker SP(C), as shown in FIG. 1.

Another speaker configuration, for example, a so-called "5.1 channel speaker system" including a sub woofer speaker, may be constructed.

Although a detailed configuration is described below, the STR 60 selects a broadcast signal, an analog audio signal, and a digital audio signal received by a built-in tuner, and also, selects a plurality of audio sources externally input via an IEEE1394 bus 116 and ultimately outputs the selected signal as sound from the speaker unit SP.

A remote controller RM for remotely controlling the STR 60 is also shown in FIG. 1. The STR 60 receives an operation command signal in response to an operation performed on the remote controller RM, and performs a certain operation according to the operation command signal. Although the remote controller RM corresponding to the STR 60 only is shown in FIG. 1, the other devices may also be provided with a remote controller RM.

The disk drive 30, which is manufactured by the same manufacturer as the STR 60, is disposed. The disk drive 30 can implement various system functions exhibiting high practicality by being connected to the STR 60.

The disk drive 30 serves as a disk player compatible with, for example, CDs, SACDs, and DVDs, and plays back data from a disk loaded in the disk drive 30.

The disk drive 30 outputs audio data obtained by playing back the disk via the IEEE1394 bus 116.

As is known, audio data played back from a CD is 16-bit-quantized linear pulse code modulation (PCM) data having a sampling frequency of 44.1 KHz.

When playing back from a DVD, not only audio data, but also video data is sometimes played back. Accordingly, the disk drive 30 is also provided with a video decoding function. Although it is not shown in FIG. 1, a display device, for example, a cathode ray tube or a liquid crystal device, may be connected to the disk drive 30 so that images played back from a DVD can be displayed.

SACDs are media using a $\Sigma\Delta$-modulated one-bit digital audio signal format (direct stream digital (DSD)). This DSD signal is one-bit-quantized digital audio data having a sampling frequency 64 times as high as the sampling frequency fs (fs=44.1 KHz) of CDs, and can play back signals exceeding the audio frequency band.

To deal with such SACDs, the disk drive 30 has a decoding function for DSD signals.

By connecting the disk drive 30 to the STR 60 via the IEEE1394 bus 116, the output from CDs, DVDs, and SACDs can be played back by the speaker system connected to the STR 60.

The first devices 100, which are manufactured by the same manufacturer as that of the STR 60 and the disk drive 30, are digital AV machines having a communication function compatible with the IEEE1394 bus 116. The first devices 100 may be a CD player, a Mini Disk (MD) recorder/player, or a digital video cassette recorder (VCR).

The first devices 100 are different from the disk drive 30 or an STR-compatible MD drive 1 in that it is not provided with a system component function implemented by, mainly, the STR 60.

However, for sending and receiving commands which become effective only within the same manufacturer (referred to as "vender dependent commands"), the first devices 100 is provided with a specific function specified by the manufacturer as well as the STR 60, the disk drive 30, and the STR-compatible MD drive 1.

If, for example, the STR 60, is manually operated to select and receive data from the first devices 100 as the audio source, the data can be monitored or recorded as sound.

The second devices 110, which are manufactured by a manufacturer different from that of the STR 60 and the disk drive 30, are also digital AV machines having a communication function compatible with the IEEE1394 bus 116. The second devices 110 may also be a CD player, an MD recorder/player, or a digital VCR. In principle, however, the second devices 110 are not compatible with the vendor dependent commands defined by the manufacturer of the STR 60.

Each AV machine shown in FIG. 1 is provided with a power receptacle for receiving power from a commercial AC power supply, though it is not shown. Alternatively, it may contain batteries if it is battery-driven. That is, each AV machine can receive power independently.

1-2 STR (Front Panel)

A description is now given of the elements on a front panel as the external configuration of the main elements of the system shown in FIG. 1, i.e., the STR 60 and the disk drive 30 forming a component AV system.

Figure 2:
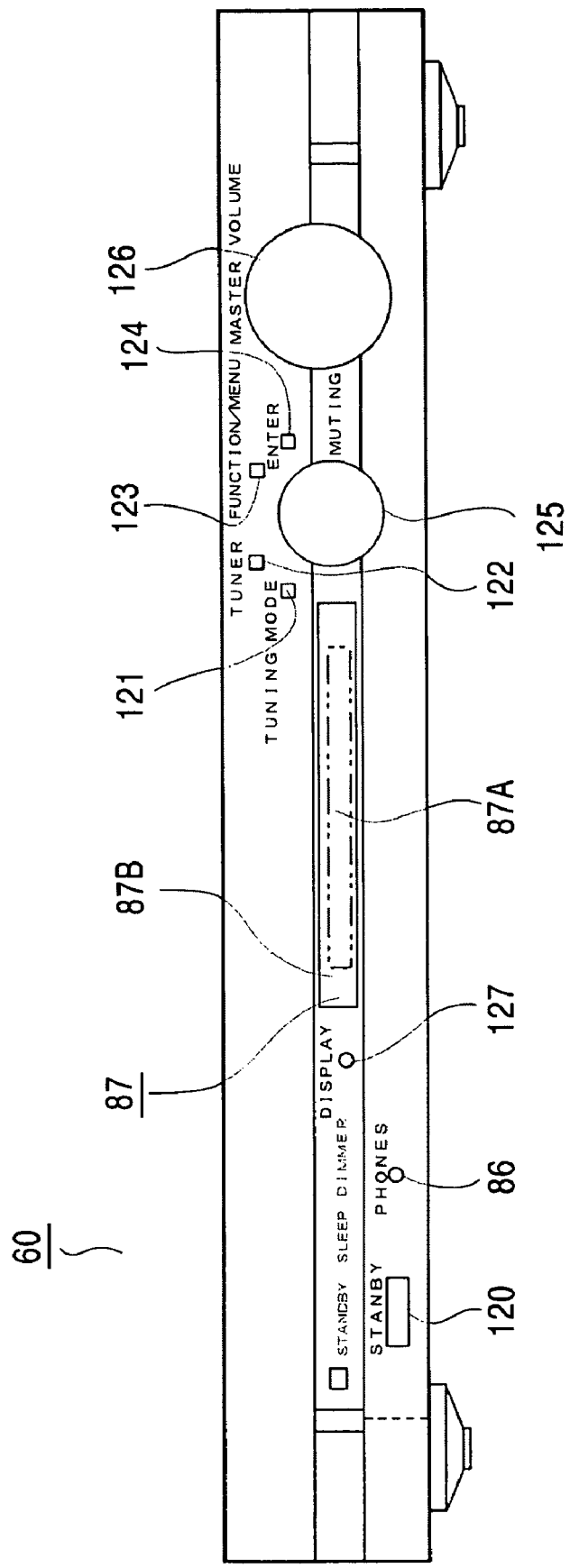
FIG. 2 is a front view illustrating the front panel of a stereo tuner receiver (STR)

FIG. 2 illustrates elements on the front panel of the STR 60. A power supply key 120 is provided at the bottom left of the front panel. By operating this power supply key 120, the STR 60 can be powered ON/OFF. When the power is OFF, the standby power supply is operating, that is, the STR 60 is in the standby mode, which is different from the state in which the supply of a commercially AC power supply (or batteries) is interrupted. The same applies to the disk drive 30.

Although a detailed explanation is not given here, a sleep mode is also provided for the STR 60, thereby implementing power saving.

At the right of the power supply key 120, a headphone jack 86 is disposed.

A display unit 87 is disposed substantially at the center of the front panel. The display unit 87 includes a fluorescent (FL) tube display portion 87A mainly used for displaying characters (one line consisting of 14 characters). The display unit 87 also includes a segment display portion 87B around the FL tube display portion 87A, and predetermined content is displayed in the segment display portion 87B as segments, though it is not shown in FIG. 2.

A display key 127 is provided at the left of the display unit 87. The display key 127 is mainly used for changing the content displayed in the display unit 87.

At the right of the FL tube display portion 87A, a jog dial 125 is provided, and a tuning mode key 121, a tuner key 122, a function/menu key 123, and an enter key 124 are provided above the jog dial 125.

The tuning mode key 121 and the tuner key 122 are keys related to the tuner function of the STR 60, and are used for switching reception bands and tuner modes, respectively.

The function/menu key 123 is used for selecting functions and menus, and the enter key 124 is used for determining the operation.

The jog dial 125 is used together with one of the above-described keys according to a predetermined operation procedure, thereby enabling the user to perform various operations.

For example, every time the function/menu key 123 is pressed once, the content displayed in the FL tube display portion 87A changes as Function→SOUND→SETUP.

Then, for example, when the jog dial 125 is rotated while FUNCTION is being displayed in the FL tube display portion 87A, the source which is to be input and output by the STR 60 as monitor sound can be changed. In this case, the name of the input source which is currently selected according to the rotation of the jog dial 125 is displayed in the FL tube display portion 87A. According to this operation, for example, tuner sound, analog input, optical digital input, and individual sources (devices) input via the IEEE1394 bus 116 can be sequentially selected according to a predetermined order.

The tuning mode key 121, the tuner key 122, the function/menu key 123, and the enter key 124 are each provided with a light emitting diode (LED) for decoration at the back side thereof, and the LED can be switched ON or blink according to the operating state.

A volume jog 126 serves as a dial key for adjusting the audio signal level output from the STR 60, for example, the volume of sound output from the speaker unit SP.

1-3 STR-Compatible Disk Drive (Front Panel)

Figure 3:
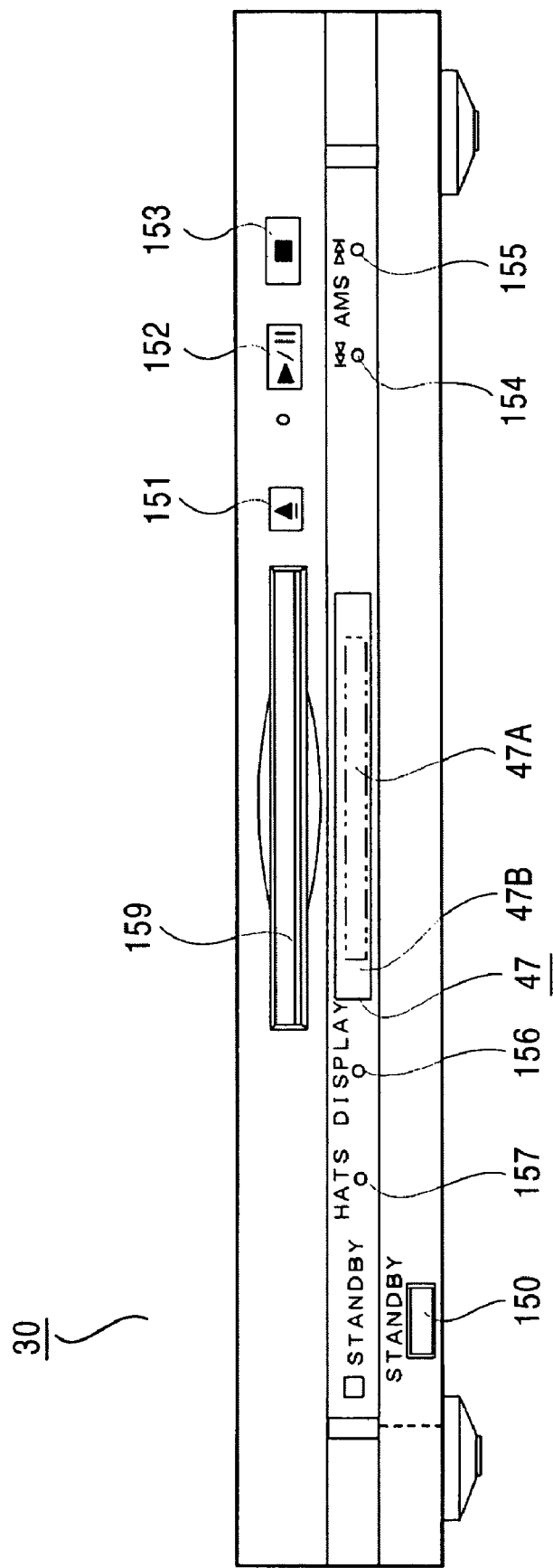
FIG. 3 is a front view illustrating the front panel of an STR-compatible disk drive.

FIG. 3 illustrates element on the front panel of the disk drive 30.

Also at the bottom left of the front panel of the disk drive 30, a power supply key 150 for powering the disk drive 30 ON/OFF (standby) is provided.

At the top center of the front panel of the disk drive 30, a disk loading/unloading portion 159 is provided for loading/unloading disks, for example, CDs, SACDs, and DVDs. For unloading, for example, a CD, loaded in the disk loading/unloading portion 159, an eject key 151 disposed at the right of the disk loading/unloading portion 159 is operated.

Below the disk loading/unloading portion 159, a display unit 47 including an FL tube display portion 47A for displaying characters (one line consisting of 14 characters) and a segment display portion 47B is disposed. In this case, in the FL tube display portion 47A, information concerning the playback status, for example, the track number or playback time of a track, which is currently played back, of a loaded CD, or text data recorded in a CD, is displayed as characters. The playback mode is indicated in the segment display portion 47B.

The content displayed in the FL tube display portion 47A can be switched by operating a display key 156 disposed at the left of the display unit 47.

At the right of the front panel, a playback/pause key 152, a stop key 153, a random-access/fast-forward key 154, and a fast-backward key 155 are provided as the keys related to the playback operation of CDs.

A High quality digital Audio Transmission System (HATS) key 157 for displaying ON/OFF states of a HATS function is disposed at the left side of the front panel.

The HATS is a function of preventing deterioration in the quality of digital audio signals due to jitter of a transmission clock.

For example, when transmitting audio data from the disk drive 30 to the STR 60 via the IEEE1394 bus 116, the audio data received by the STR 60 has a fluctuation in the time domain due to jitter of the transmission clock. Then, in the STR 60, the received audio data is temporarily stored in a buffer memory based on the transmission clock, and then, it is read out from the buffer memory based on a quartz clock, thereby solving the problem of a fluctuation of the audio data in the time domain. When the HATS function is ON, signals for flow control are sent and received between the disk drive 30 and the STR 60.

As is seen from the front panels shown in FIGS. 2 and 3, the STR 60 and the disk drive 30 have the individual display units 87 and 47, respectively. In other words, when considering the system consisting of the STR 60 and the disk drive 30 as a single audio component system, an integrated display unit for this component system is not provided. That is, devices connected to each other via the IEEE1394 bus 116 are independent devices.

1-4 STR (Internal Configuration)

The internal configurations of the STR 60 and the disk drive 30 are described below.

Figure 4:
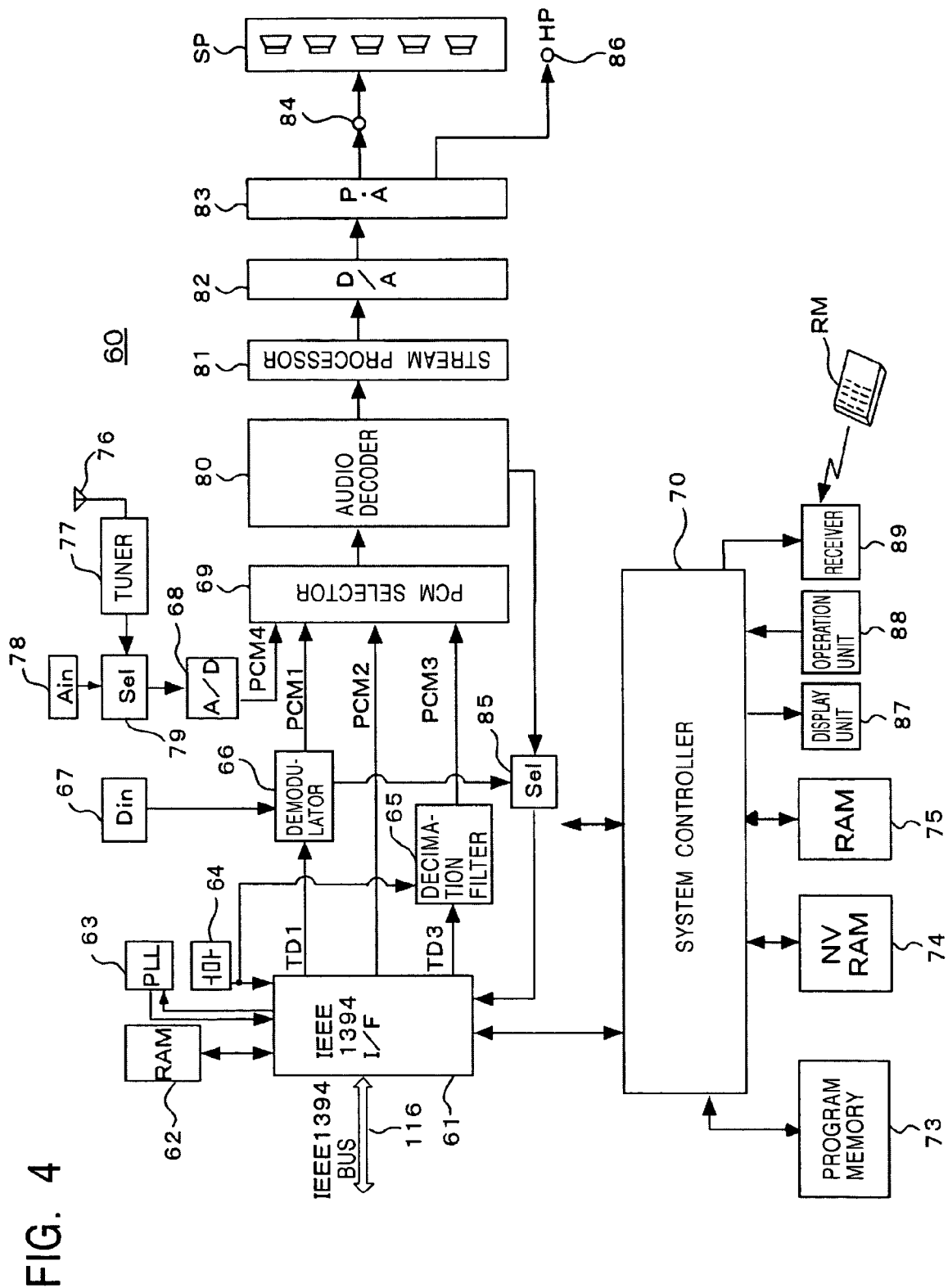
FIG. 4 is a block diagram illustrating the internal configuration of the STR.

FIG. 4 is a block diagram illustrating the internal configuration of the STR 60.

In the STR 60, four types of audio sources, i.e., an audio signal sent via the IEEE1394 bus 116, an audio signal of a tuner contained in the STR 60, an external digital audio signal input from an optical digital input terminal 67, and an external analog audio signal input from an analog input terminal 78, can be input.

An IEEE1394 interface 61 is provided for sending and receiving data with external devices via the IEEE1394 bus 116. With this configuration, the STR 60 can send and receive AV data and various commands to and from external devices.

The IEEE1394 interface 61 demodulates packets received via the IEEE1394 bus 116 so as to extract data contained in the demodulated packets. The IEEE1394 interface 61 further converts the extracted data into a format compatible with internal data communication.

It is now assumed that audio data is sent from another AV machine via the IEEE1394 bus 116. The IEEE1394 interface 61 receives the audio data and demodulates the packets.

If the AV machine that has sent the audio data is the disk drive 30 and if the received audio data is played back from a CD, or a DVD, the IEEE1394 interface 61 converts the playback data into audio data TD1 compatible with, for example, a digital audio data interface format, which is referred to as "IEC60958".

The audio data TD1 is then supplied to a demodulator 66. The demodulator 66 then performs predetermined demodulation on the input audio data TD1 according to the IEC60958 format, and outputs the demodulated audio data to a PCM selector 69 as linear PCM data (PCM1).

An external digital audio signal input from the optical digital input terminal 67 is also compliant with the IEC60958 format. The external digital audio signal is also demodulated in the demodulator 66 and is supplied to the PCM linear selector 69 as linear PCM data (PCM1).

Upon receiving SACD playback data via the IEEE1394 bus 116, the IEEE1394 interface 61 demodulates the packets, and then outputs a 64-fs $\Sigma\Delta$-modulated one-bit-quantized DSD signal TD3 to a decimation filter 65.

The decimation filter 65 converts the DSD signal TD3 into linear PCM data (PCM3) and supplies it to the PCM selector 69.

A phase-locked loop (PLL) 63 generates a clock for demodulating packets based on a transmission clock. When the above-described HATS function is OFF, the DSD signal TD3 and IEC60958 data TD1 based on the clock generated by the PLL 63 are output.

A random access memory (RAM) 62 serves as a data buffer for storing data to be sent or received by the IEEE1394 interface 61. A clock oscillator 64 generates a quartz clock.

When audio data played back by a CD, or a DVD is received by the IEEE1394 interface 61 while the above-described HATS function is ON, the audio playback data is temporarily stored in the RAM 62 and is read out from the RAM 62 based on the quartz clock generated by the clock oscillator 64. The IEEE1394 interface 61 is also provided with a demodulating function for IEC60958 data. When the HATS function is ON, the IEEE1394 interface 61 demodulates the data read from the RAM 62 and outputs the demodulated data to the PCM selector 69 as linear PCM data (PCM2).

When data played back from an SACD is received by the IEEE1394 interface 61 while the HATS function is ON, the data is temporarily stored in the RAM 62 and is then read out from the RAM 62 based on the quartz clock generated by the clock oscillator 64. Then, the read DSD signal TD3 is supplied to the decimation filter 65 and is converted into linear PCM data (PCM3) therein, and the data is then supplied to the PCM selector 69.

A tuner 77, which is built in the STR 60, tunes and demodulates radio broadcast waves received by an antenna 76, and outputs the resulting signal to a selector 79 as, for example, an analog audio signal.

An analog audio signal input via the analog audio signal input terminal 78 is also input into the selector 79.

Under the control of, for example, a system controller 70, the selector 79 selects the tuner 77 or the analog audio signal input terminal 78 as the input source, and supplies the analog audio signal received by the selected input source to an analog-to-digital (A/D) converter 68. The A/D converter 68 converts the input analog audio signal into linear PCM data (PCM4) and supplies it to the PCM selector 69.

The PCM selector 69 selects the linear PCM data PCM1 PCM2, PCM3, and PCM4 under the control of the system controller 70. That is, the PCM selector 69 switches the input function.

The linear PCM data selected by the PCM selector 69 is supplied to an audio decoder 80.

The audio decoder 80 is formed of a digital signal processor (DSP) and performs various types of signal processing and speaker channel separation on the audio data.

Then, the output of the audio decoder 80 is subjected to equalizing processing or other sound field processing in a stream processor 81 so that it is converted into, for example, 5-channel audio data. The 5-channel audio data is then converted into an analog audio data in a digital-to-analog (D/A) converter 82, and is amplified in a power amplifier 83.

The audio signal is then supplied to a speaker unit SP connected to a speaker connecting terminal 84 in the STR 60 and is output as sound. The speaker unit SP includes speakers SP(FL), SP(FR), SP(SL), SP(SR), and SP(C) shown in FIG. 1, and the speaker connecting terminal 84 is provided for each speaker, though only one terminal 84 is shown in FIG. 4.

The output of the power amplifier 83 is also supplied to the headphone jack 86 so that it can be output from the headphone.

When outputting audio data input into the STR 60 to an external device via the IEEE1394 bus 116, data output from the audio decoder 80 is supplied to the IEEE1394 interface 61 via a selector 85. Alternatively, the output from the demodulator 66 is supplied to the IEEE1394 interface 61 via the selector 85.

Data supplied to the IEEE1394 interface 61 has been modulated so that it can be compatible with a digital audio interface format, for example, IEC60953.

The IEEE1394 interface 61 performs predetermined processing, for example, packet formation, on the supplied data by using, for example, the RAM 62, so as to convert the data into a format compatible with IEEE1394. The IEEE1394 interface 61 then outputs the data to a target device via the IEEE1394 bus 116.

The system controller 70 includes, for example, a central processing unit (CPU), and performs the entire control on the operations performed by the STR 60.

The system controller 70 controls user operations and also controls data to be displayed for the user. That is, information from a receiver 89 or an operation unit 88 is input into the system controller 70. For example, radio command signals from the remote controller RM are received by the receiver 89, and are supplied to the system controller 70.

The operation unit 88 is formed of various keys disposed on the front panel shown in FIG. 2, and information concerning an operation performed on the operation unit 88 is supplied to the system controller 70.

The system controller 70 controls various elements so that a required operation in response to a command signal or operation information input as described above can be performed.

The system controller 70 also controls the display unit 87 to display the required content so that required information in response to a command signal, operation information, or the current operation status can be displayed. As stated above, the display unit 87 includes the FL tube display portion 87A and the segment display portion 87B.

The system controller 70 also controls the IEEE1394 interface 61, and more specifically, it controls communication operation performed via the IEEE1394 bus 116. The system controller 70 also performs SRM-related processing as described below.

In a program memory 73, programs for implementing various operations in the STR 60 are stored.

In a non-volatile RAM (NV-RAM) 74, which is a storage area in which data can be held even when power is OFF, various control constants and SRM data, which is discussed below, are stored.

In a RAM 75, data required for executing various types of processing by the system controller 70 is stored, and the RAM 75 is used as a work area.

The NV-RAM 74, the RAM 75, and the program memory 73 are formed as a storage area in the system controller 70, which is formed as a chip, or may be formed as a separate chip.

The IEEE1394 interface 61 also receives data, for example, commands and responses, sent from external devices, and sends commands and responses to external devices. The system controller 70 also performs required processing for sending and receiving commands and responses.

1-5 STR-Compatible Disk Drive (Internal Configuration)

The internal configuration of the disk drive 30 is described below with reference to the block diagram of FIG. 5.

A disk 91, for example, a CD, an SACD, or a DVD, is inserted into the disk loading/unloading portion 159 disposed on the front panel of the disk drive 30 so that it can be installed at a playback position.

The disk 91 installed at the playback position is rotated at a constant linear velocity (CLV) by a spindle motor 31. Then, data recorded in the form of pits (embossed pits, phase change pits, pigmentary change pits, etc.) is read from the disk 91 by an optical head 32, and is supplied to a radio frequency (RF) amplifier 35. In the optical head 32, an objective lens 32a is held by a biaxial mechanism 32b, and can be displaced in the tracking direction and the focusing direction.

The optical head 32 is also movable in the radial direction of the disk 91 by a sled mechanism 34.

The RF amplifier 35 generates, not only a playback RF signal, but also a focusing error signal and a tracking error signal, and supplies these error signals to a servo circuit 36.

The servo circuit 36 generates a focusing drive signal, a tracking drive signal, and a sled drive signal from the focusing error signal and the tracking error signal so as to control the biaxial mechanism 32b and the sled mechanism 34. That is, the servo circuit 36 performs focusing servo control and tracking servo control.

The playback RF signal binarized in the RF amplifier 35 is also output to a timing generator 40. The timing generator 40 generates a timing signal based on the waveform timing of this playback RF signal and outputs the timing signal to a CLV processor 41. The CLV processor 41 generates a drive signal for operating the spindle motor 31 at a required CLV based on the timing signal, and supplies the drive signal to the spindle motor 31. Accordingly, spindle servo control for controlling the rotation of the disk 91 at a required CLV can be performed.

A system controller 50 controls the servo circuit 36 and the timing generator 40 so as to perform required processing, such as spindle-motor ON/OFF operation, servo setting, track jump, and access.

The playback RF signal is supplied to a DSD decoder 37 and an AV decoder 38.

The system controller 50 controls the AV decoder 38 and the DSD decoder 37 so that the AV decoder 38 is operated when playing back a CD, or a DVD, and the DSD decoder 37 is operated when playing back an SACD.

The AV decoder 38 performs eight-to-fourteen modulation (EFM) demodulation, error correction decoding, and descrambling on the binarized CD playback signal (EFM signal). The AV decoder 38 performs EFM+ demodulation, error correction decoding, and descrambling on the binarized DVD playback signal (EFM+ signal).

Then, the AV decoder 38 decodes, for example, 16-bit-quantized audio data having a 44.1 KHz sampling format and supplies the decoded audio data to an IEEE1394 interface 39.

The AV decoder 38 also serves as a video decoder, and decodes a video signal played back from a DVD. The decoded video signal is supplied to a video monitor device (not shown) from a video output terminal 53 and is output as images.

The DSD decoder 37 decodes a binarized DSD signal played back from an SACD. The DSD signal is supplied to the IEEE1394 interface 39.

The recording surface of an SACD is a two-layered structure. In some SACDs, DSD data is recorded on one layer, and CD data is recorded on the other layer. When playing back the CD data of one of the layers, it is decoded in the AV decoder 38.

The AV decoder 38 and the DSD decoder 37 can extract control data, for example, sub codes.

For example, the AV decoder 38 can extract table of contents (TOC) information recorded in the lead-in area of the disk 91 in the form of sub codes. The sub code data and TOC are supplied to the system controller 50 and are used for various control operations.

The playback RF signal binarized in the RF amplifier 35 is also supplied to a PLL circuit 55.

The PLL circuit 55 outputs a clock synchronized with the channel bit of the input EFM signal. This clock is used as the clock for a signal processing circuit system at a stage subsequent to the DSD decoder 37 and the AV decoder 38.

The decoded audio data input into the IEEE1394 interface 39 is converted into data compatible with the IEEE1394 format and is output to an external device via the IEEE1394 bus 116.

Although it is not shown, a digital interface and an optical digital output terminal may be provided, in which case, audio data from the AV decoder 38 or the DSD decoder 37 can be output as digital data.

A D/A converter and an analog output terminal may be provided, in which case, decoded audio data can be converted into an analog audio signal and is output to an external device.

The system controller 50 is formed as a microcomputer including a CPU, and controls the above-described various types of operations.

When playing back data from the disk 91, management information, that is, TOC, recorded on the disk 91 has to be read. The system controller 50 determines the number of tracks in the disk 91 and the addresses of the individual tracks from this management information, and then, controls the playback operation. Accordingly, when the disk 91 is installed, the system controller 50 reads the innermost area (lead-in area) of the disk 91 in which TOC is recorded so as to extract TOC information, as discussed above. Then, the system controller 50 stores the TOC in the built-in RAM so that it can refer to this TOC when performing playback operation on the disk 91 later.

The system controller 50 controls user operation and also controls data to be output and displayed for the user. That is, information from a receiver 45 and an operation unit 48 is input into the system controller 50. For example, a radio command signal sent from the remote controller RM is received by the receiver 45, and is supplied to the system controller 50.

The operation unit 48 is formed of various keys disposed on the front panel of the disk drive 30 shown in FIG. 3, and information in response to an operation performed on the operation unit 48 is supplied to the system controller 50.

The system controller 50 performs various control operations so that a required operation in response to a command signal or operation information input as described above can be performed.

The system controller 50 also controls the display unit 47 to display content so that required information in response to a command signal, operation information, or the current operation status can be displayed.

The display unit 47 displays, for example, time information, for example, the total performance time of the disk 91 and the playback or recording progress time, or name information, for example, track number, disk name, and track name, the operation status, and the operation mode.

As stated above, the display unit 47 includes the FL tube display portion 47A and the segment display portion 47B.

The system controller 50 controls the IEEE1394 interface 39, and more specifically, it controls communication operation performed via the IEEE1394 bus 116. The system controller 50 also performs SRM-related processing, which is described below.

In a program memory 42, programs for implementing various operations in the disk drive 30 by the system controller 50 are stored.

In a non-volatile RAM (NV-RAM) 43, which is a storage area in which data can be held even when power is OFF, various control constants and SRM data, which is discussed below, are stored.

In a RAM 44, data required for executing various types of processing by the system controller 50 is stored, and the RAM 44 is used as a work area.

The NV-RAM 43, the RAM 44, and the program memory 42 are formed as a storage area in the system controller 50, which is formed as a chip, or may be formed as a separate chip.

The IEEE1394 interface 39 also receives data, for example, commands and responses, sent from external devices, and sends commands and responses to external devices. The system controller 50 also performs required processing for sending and receiving commands and responses.

2. IEEE1394 Data Communication in this Embodiment 2-1 Overview

A description is given below of data communication compliant with the IEEE1394 standards according to this embodiment.

IEEE1394 is one of the serial data communication standards. The IEEE1394 data transmission formats include an isochronous communication format in which periodic communication is conducted and an asynchronous communication format in which asynchronous communication is conducted. Generally, the isochronous communication format is used for sending and receiving data, while the asynchronous communication format is used for sending and receiving control commands. Data and control commands of the two communication formats can be sent and received by using only one cable.

The transmission mode of this embodiment is described below based on the IEEE1394 standards.

2-2 Stack Model

Figure 6:
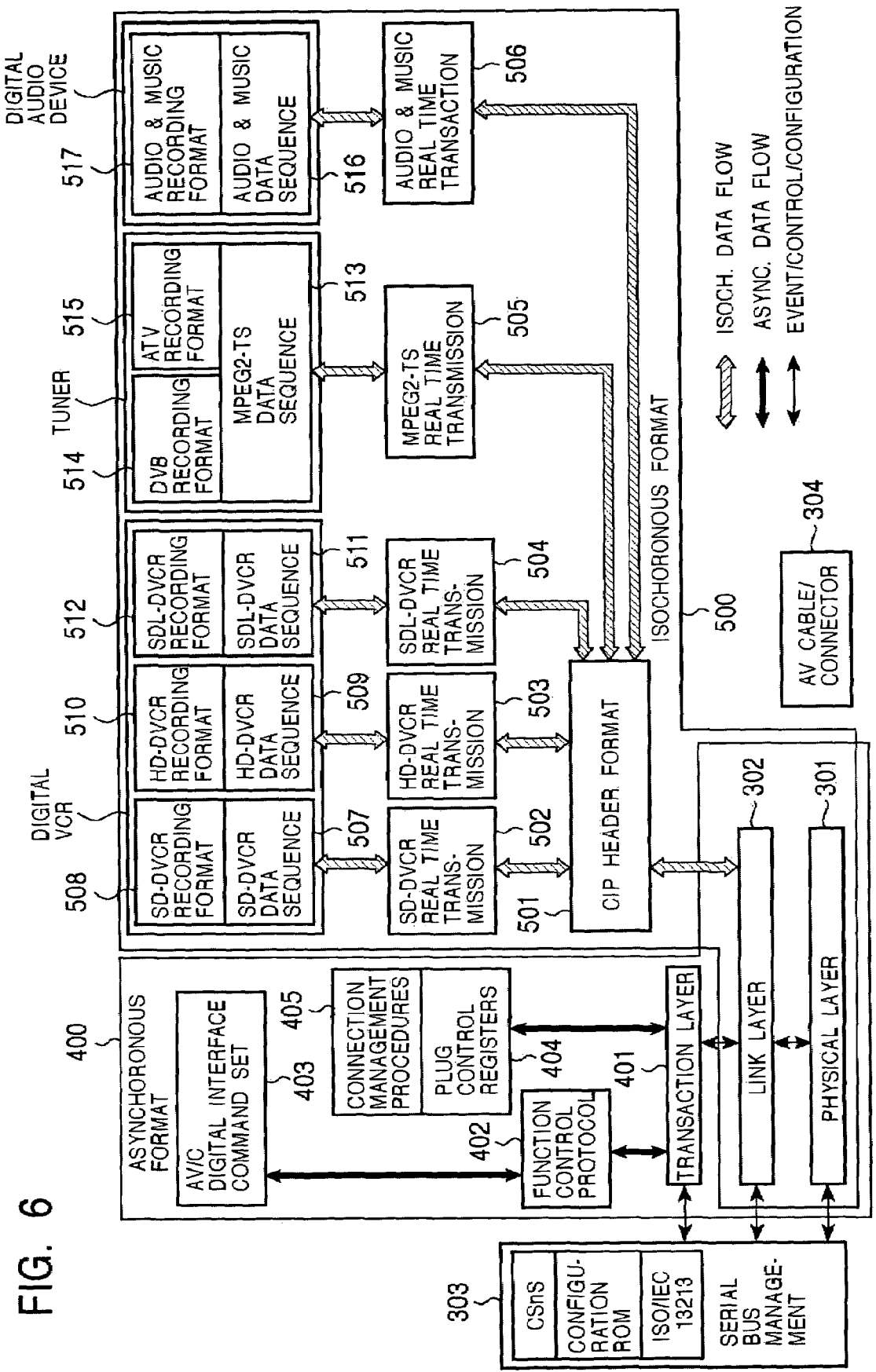
FIG. 6 illustrates an IEEE1394 stack model used in this embodiment.

FIG. 6 illustrates an IEEE1394 stack model used in this embodiment.

The IEEE1394 format is divided into an asynchronous format (400) and an isochronous format (500).

As the layers common to the asynchronous format (400) and the isochronous format (500), a physical layer (301) is provided as the bottommost layer, and a link layer (302) is provided above the physical layer (301). The physical layer (301) is a layer for hardware, and more specifically, for transmitting signals, and the link layer (302) has a function of converting an IEEE1394 bus into an internal bus defined for each device.

The physical layer (301), the link layer (302), and a transaction layer (401), which is discussed below, are linked to a serial bus management 303 by event/control/configuration lines. An AV cable/connector 304 is a physical connector/cable for AV data transmission.

In the asynchronous format (400), the transaction layer (401) is disposed on the link layer (302). The transaction layer (401) defines data transmission protocols as IEEE1394. As the basic asynchronous transactions, write transaction, read transaction, and lock transaction are defined, as discussed below.

A function control protocol (FCP) (402) is defined above the transaction layer (401). The FCP (402) can execute command control on various AV machines by using control command defined as an AV/C command (AV/C digital interface command set) (403).

As the layer above the transaction layer (401), plug control registers (404) are defined for setting a plug (IEEE1394 logical device connection relationship) by using connection management procedures (505).

In the isochronous format (500), a common isochronous packet (CIP) header format (501) is defined above the link layer (302), and transmission protocols, such as an SD-DVCR real time transmission (502), an HD-DVCR real time transmission (503), an SDL-DVCR real time transmission (504), an MPEG2-TS real time transmission (505), an audio and music real time transmission (506), are managed by the CIP header format (501).

The SD-DVCR real time transmission (502), the HD-DVCR real time transmission (503), and the SDL-DVCR real time transmission (504) are data transmission protocols corresponding to digital VCRs.

Data handled by the SD-DVCR real time transmission (502) is formed into a data sequence (SD-DVCR data sequence (507)) obtained according to the definition of an SD-DVCR recording format (508).

Data handled by the HD-DVCR real time transmission (503) is formed into a data sequence (HD-DVCR data sequence (509)) obtained according to the definition of an HD-DVCR recording format (510).

Data handled by the SDL-DVCR real time transmission (504) is formed into a data sequence (SD-DVCR data sequence (511)) obtained by according to the definition of an SDL-DVCR recording format (512).

The MPEG2-TS real time transmission (505) is a transmission protocol for tuners corresponding to digital satellite broadcasts, and data handled by the MEPG2-TS real time transmission (505) is formed into a data sequence (MPEG2-TS data sequence (513)) obtained according to the definition of an DVB recording format (514) or an ATV recording format (515).

The audio and music real time transmission (506) is a transmission protocol for digital audio machines including the MD system of this embodiment, and data handled by the audio and music real time transmission (506) is formed into a data sequence (audio and music data sequence (516)) obtained according to the definition of an audio and music recording format (517).

2-3 Signal Transmission Mode

Figure 7:
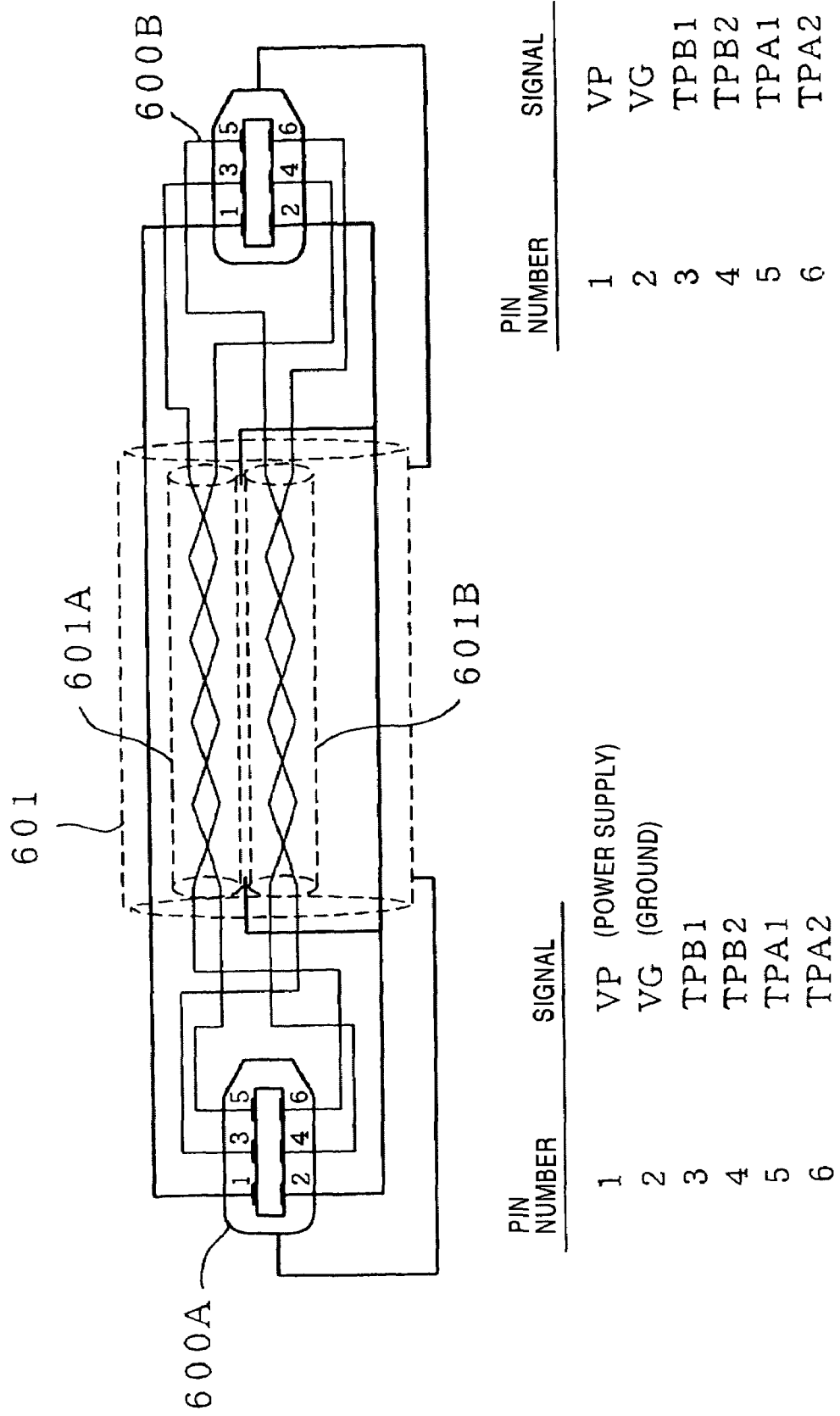
FIG. 7 illustrates a cable structure used in IEEE1394.

FIG. 7 illustrates an example of the structure of a cable used as an IEEE1394 bus.

In FIG. 7, a connector 600A and a connector 600B are connected with each other via a cable 601. As pin terminals for the connectors 600A and 600B, six pin terminals referred to as pin numbers 1 through 6 are used.

Pin number 1 is for power (VP), pin number 2 is for a ground (VG), pin number 3 is for TPB1, pin number 4 is for TPB2, pin number 5 is for TPA1, and pin number 6 is for TPA2.

The connection states of the pins between the connectors 600A and 600B are as follows.
Pin number 1 (VP)—pin number 1 (VP)
Pin number 2 (VG)—pin number 2 (VG)
Pin number 3 (TPB1)—pin number 5 (TPA1)
Pin number 4 (TPB2)—pin number 6 (TPA2)
Pin number 5 (TPA1)—pin number 3 (TPB1)
Pin number 6 (TPA2)—pin number 4 (TPB2)

Among the above-described pin connections, two twist cables connecting the following pins form a signal line 601A for differentially transmitting signals.
Pin number 3 (TPB1)—pin number 5 (TPA1)
Pin number 4 (TPB2)—pin number 6 (TPA2)

Two twist cables connecting the following pins form a signal line 601B for differentially transmitting signals.
Pin number 5 (TPA1)—pin number 3 (TPB1)
Pin number 6 (TPA2)—pin number 4 (TPB2)

Figure 8:
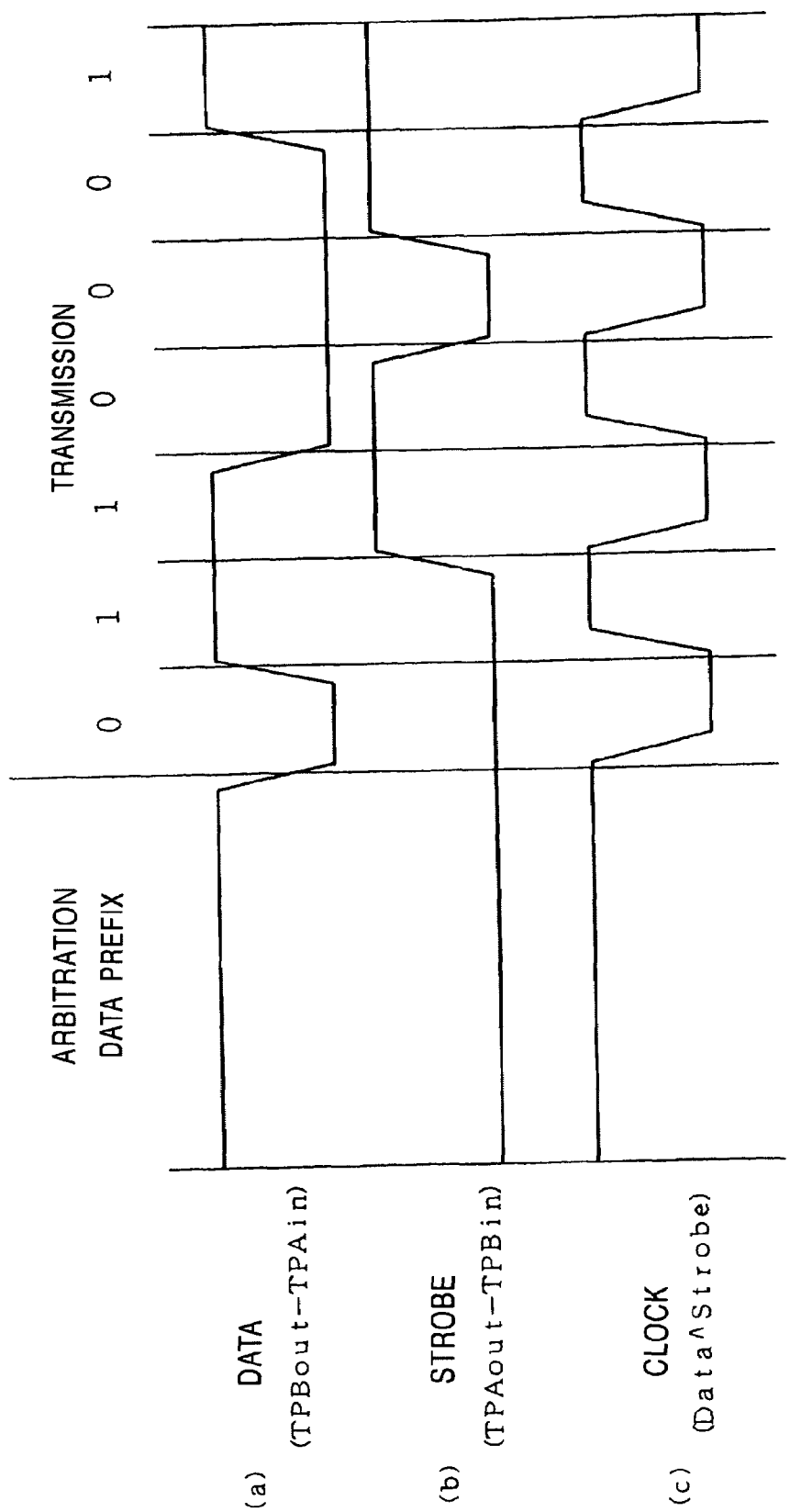
FIG. 8 illustrates a signal transmission mode in IEEE1394.

Signals transmitted through the signal lines 601A and 601B are a data signal indicated by (a) of FIG. 8 and a strobe signal indicated by (b) of FIG. 8.

The data signal indicated by (a) of FIG. 8 is output from TPB1 or TPB2 and is input into TPA1 or TPA2 by using one of the signal line 601A or 601B.

The strobe signal indicated by (b) of FIG. 8 is a signal generated by performing logical computation of the data signal and the transmission clock synchronized with the data signal, and has a frequency lower than the actual transmission clock. The strobe signal is output from TPA1 or TPA2 and is input into TPB1 or TPB2 by using the signal line 601A or 601B which is not used for transmitting the data signal.

For example, when the data signal and the strobe signal represented by (a) and (b) of FIG. 8 are input into an IEEE1394 device, predetermined logical computation is performed on the data signal and the strobe signal in this device so as to generate a transmission clock represented by (c) of FIG. 8. The transmission clock is used for signal processing on input data.

In the IEEE1394 format, by using the transmission mode configured as described above, the need to transmit a fast cycle transmission clock between devices via a cable can be eliminated, thereby improving the reliability of signal transmission.

Instead of using six pins, power (VP) and ground (VG) may be omitted in the IEEE1394 format, and only four pins forming the signal lines 601A and 601B can be used.

In the MD recorder/player 1 of this embodiment, by using only four pins, a simple system can be provided for the user.

2-4 Bus Connection Between Devices

Figure 9:
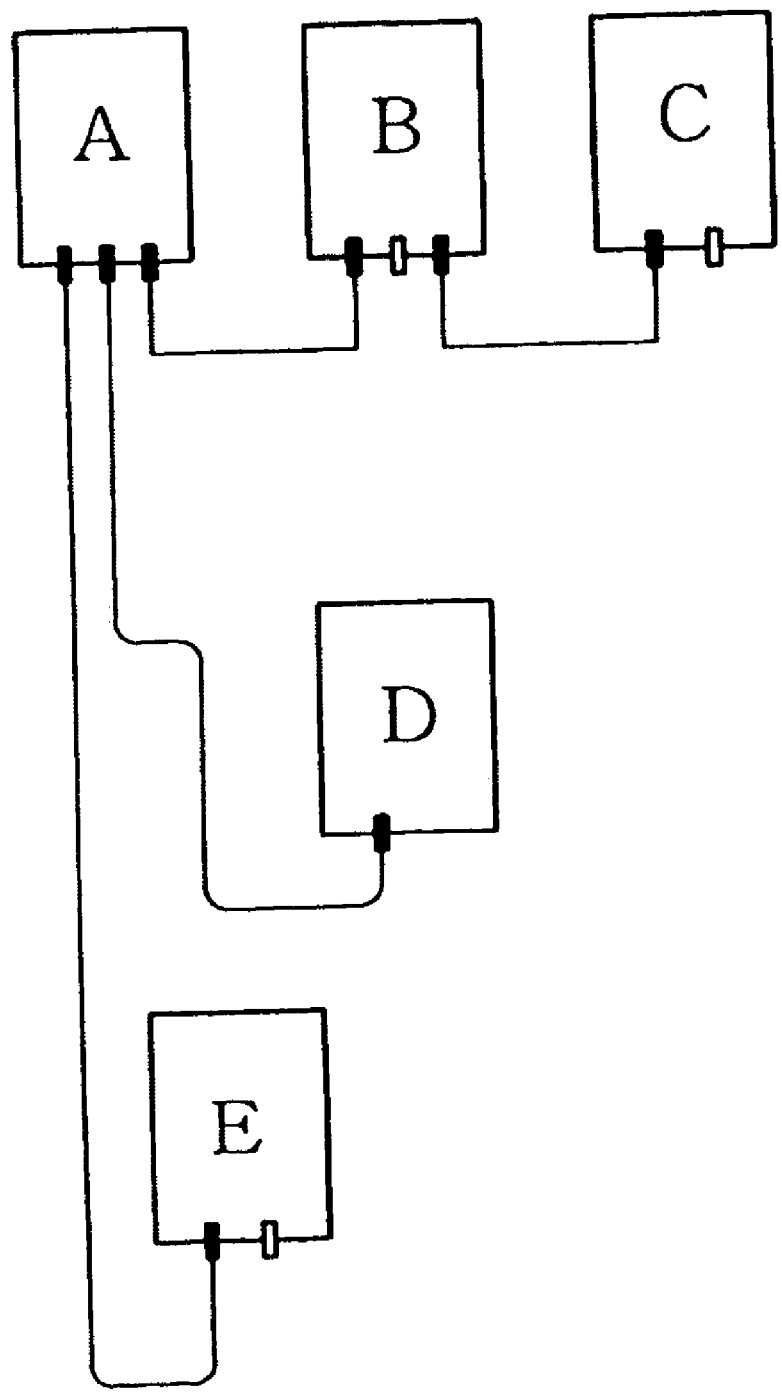
FIG. 9 illustrates an IEEE1394 bus connection.

FIG. 9 schematically illustrates an example of a device connection mode by an IEEE1394 bus. In FIG. 9, devices (nodes) A, B, C, D, and E are connected to each other via an IEEE1394 bus (cables) so that they can communicate with each other.

An IEEE1394 interface enables a so-called "daisy chain connection" for connecting devices in series with each other, as devices A, B, and C in FIG. 9, by an IEEE1394 bus. In the example shown in FIG. 9, as indicated by a connection mode between device A and devices B, D, and E, a so-called "branch connection" for connecting a certain device with a plurality of devices in parallel with each other, is also possible.

In the entire system, by using the daisy chain connection and the branch connection, a maximum of 63 devices (nodes)

can be connected. However, by using the daisy chain connection alone, a maximum of 16 devices (16 hops) can be connected. A terminator, which is required for SCSI, is not necessary for the IEEE1394 interface.

As stated above, in the IEEE1394 interface, devices connected by the daisy chain connection or the branch connection can communicate with each other. That is, in the case shown in FIG. 9, devices A, B, C, D, and E can communicate with each other.

In a system in which a plurality of devices are connected via an IEEE1394 bus (hereinafter such a system is sometimes referred to as an "IEEE1394 system"), node IDs to be assigned to the devices are set. This is schematically shown in FIGS. 10A, 10B, and 10C.

Figure 10C:
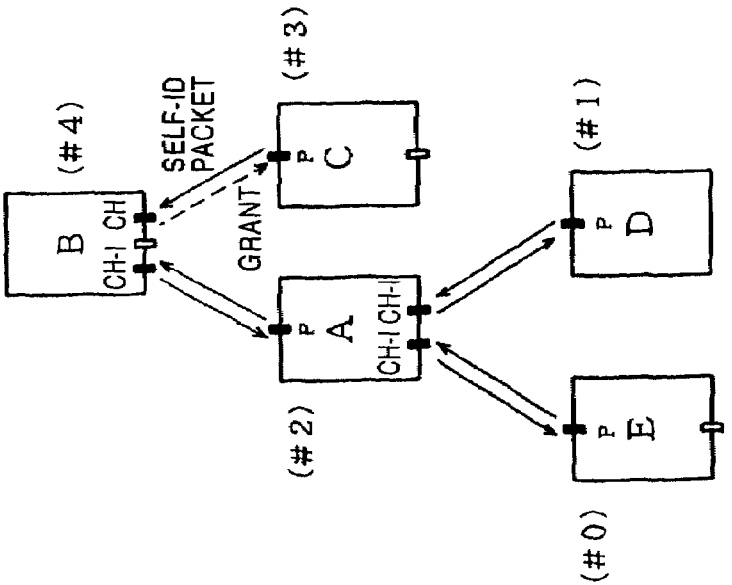
FIGS. 10A, 10B, and 10C illustrate a node ID setting procedure in an IEEE1394 system.
Figure 10B:
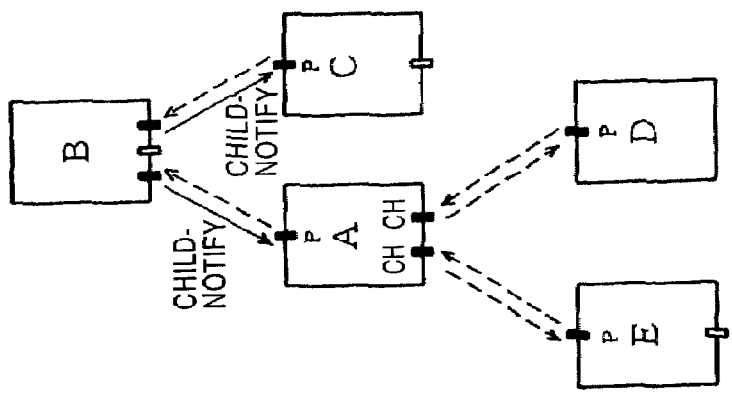
Figure 10A:
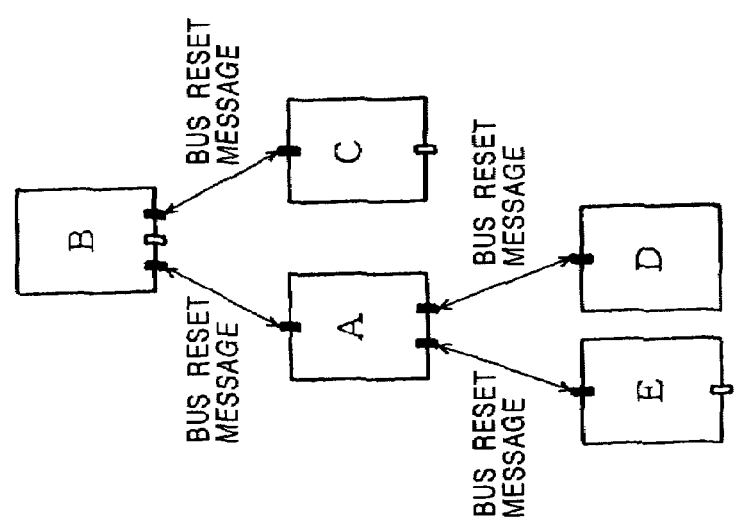

In the IEEE1394 system in which devices are connected in the connection mode shown in FIG. 10A, when a cable is inserted or removed, when a device in the system is turned ON/OFF, or when automatic processing is performed in a physical layer protocol (PLY), bus resetting occurs in the IEEE1394 system. Then, a bus reset message is sent to all the devices A, B, C, D, and E via the IEEE1394 bus.

As a result of sending this bus resets message, a parent-child relationship can be defined, as shown in FIG. 10B, in adjacent devices through communication (child-notify). That is, a tree structure is constructed for devices in the IEEE1394 system, and as a result, a root device can be defined. The root device is a device having all the devices as children (Ch). In FIG. 10B, device B is defined as the root device. In other words, the terminal of device A connected to the device B defined as the root device is defined as a parent (P).

After defining the tree structure and the root device in the IEEE1394 system as described above, self-ID packets are output from the individual devices as node-IDs, as shown in FIG. 10C. The root device sequentially grants the node-IDs so that the addresses, i.e., node-IDs, of the individual devices in the IEEE1394 system can be determined.

2-5 Packets

Figure 11:
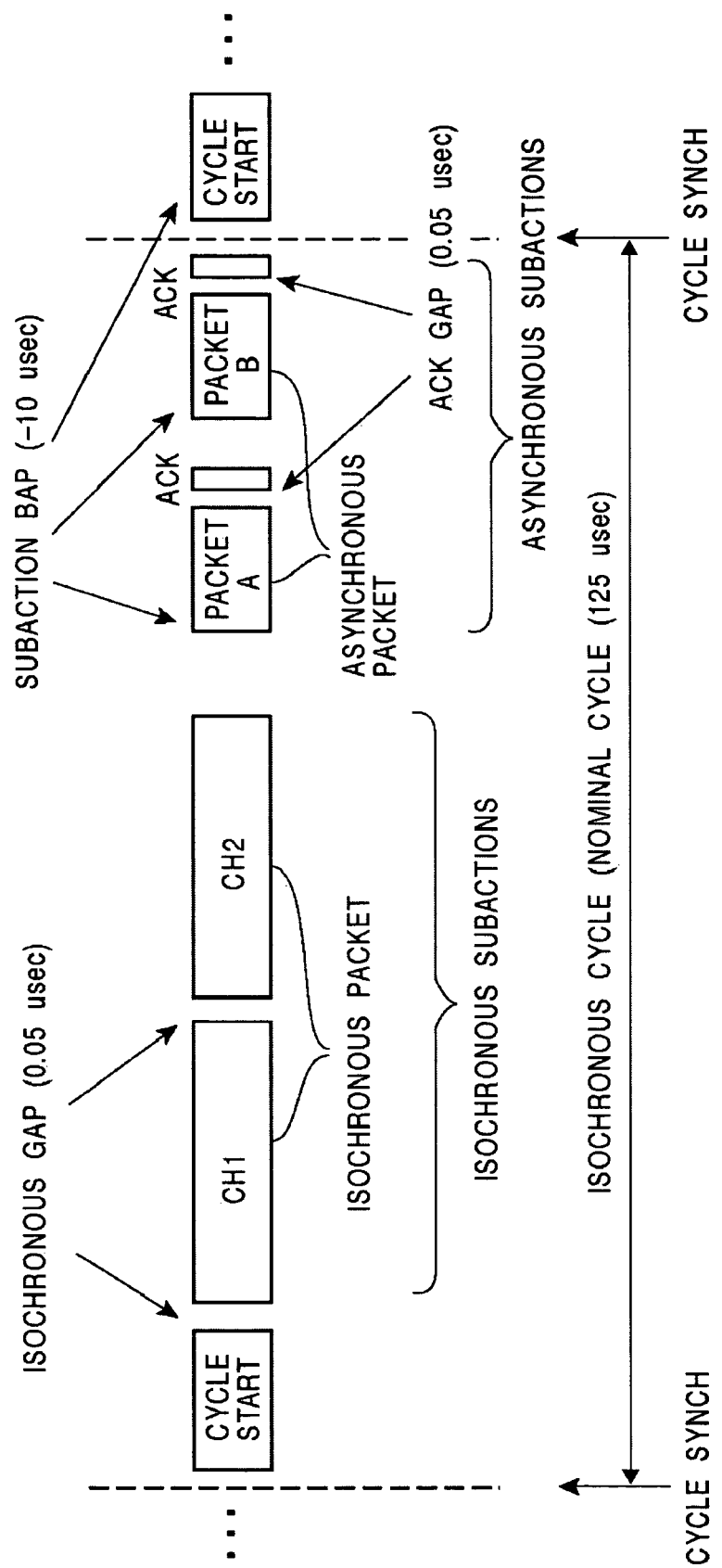
FIG. 11 illustrates an overview of packet sending in IEEE1394.

In the IEEE1394 format, isochronous cycles (nominal cycles) are repeated to perform transmission, as shown in FIG. 11. In this case, 1 isochronous cycle is 125 µsec and corresponds to 100 MHz as the band. The isochronous cycle may be other than 125 µsec. Data is formed into packets and transmitted in every isochronous cycle.

FIG. 11 shows that a cycle start packet, which indicates the start of 1 isochronous cycle, is disposed at the head of the isochronous cycle.

The cycle start packet is generated in response to an instruction from a specific device in the IEEE1394 system, which is defined as a cycle master, though a detailed explanation is not given here.

After the cycle start packet, isochronous packets are preferentially disposed. Isochronous packets are disposed by channels (isochronous subactions), as shown in FIG. 11, and are transmitted in a time division manner. Between the individual packets in the isochronous subactions, intervals referred to as "isochronous gaps" (for example, 0.05 µsec) are provided.

Thus, in the IEEE1394 system, isochronous data can be transmitted and received in multi-channels by a single transmission line.

It is now considered that compressed audio data (adaptive transform acoustic coding (ATRAC) data) compatible with the MD recorder/player 1 of this embodiment is sent in the isochronous format. If the ATRAC data is ×1 transfer rate, 1.4 Mbps, the ATRAC data having about 20 bytes is transmitted in every isochronous cycle (125 µsec) as isochronous packets, thereby ensuring time-series continuity (real time).

Though a detailed explanation is not given here, when sending ATRAC data from a certain device, the device requests an isochronous resource manager (IRM) in the IEEE1394 system to reserve the size of isochronous packets that can ensure real time transmission of the ATRAC data. The IRM then gives permission/prohibition to the requested device by monitoring the current data transmission status. If permission is given, the device can form the ATRAC data into isochronous packets and send them by using the designated channel. This is referred to as "channel allocation" in the IEEE1394 interface.

In the isochronous cycle, by using a band other than the band used by the isochronous subactions, asynchronous packets (asynchronous subactions) can be transmitted.

FIG. 11 shows that two asynchronous packets, i.e., packet A and packet B, are transmitted. After an asynchronous packet, a signal ACK (acknowledge) follows with a pause referred to as an "ack gap" (0.05 µsec). As discussed below, ACK is a signal output from a receiver (target) to inform a sender (controller) that asynchronous data has been received during the asynchronous transaction.

After and before the unit of data transmission consisting of an asynchronous packet and ACK, a pause of about 10 µsec, which is referred to as a "subaction gap", is inserted.

By sending ATRAC data in the form of isochronous packets and by sending an AUX data file which accompanies the ATRAC data in the form of asynchronous packets, the ATRAC data and the AUX data file can be apparently simultaneously transmitted.

2-6 Transaction Rules

FIG. 12A is a flowchart illustrating basic communication rules (transaction rules) in asynchronous communication. The transaction rules are defined by the FCP.

In step S11, a requester (sender) sends a request to a responder (receiver). Upon receiving the request in step S12, the responder returns acknowledge to the requester in step S13. Upon receiving acknowledge, the requester can acknowledge in step S14 that the request has been received by the responder.

Thereafter, in step S15, the responder sends a response to the requester in response to the request received in step S12. Upon receiving the response in step S16, the requester returns acknowledge to the responder in step S17. Upon receiving acknowledge, the responder can acknowledge in step S18 that the response has been received by the requester.

The request transaction transmitted in FIG. 12A is largely divided into three types, i.e., a write request, a read request, and a lock request, as indicated at the left of FIG. 12B.

The write request is a command for requesting data writing. The read request is a command for data reading. The lock request is a command for swap, compare, or mask, though a detailed explanation is not given here.

The write request can be divided into three types according to the data size of a command (operand) stored in an asynchronous packet (AV/C command packet), which is discussed below with reference to FIG. 18. The write request (data quadlet) is a request for sending commands only by the header size of an asynchronous packet. The write request (data block: data length=4 bytes) and the write request (data block: data length≠4 bytes) are requests for sending commands by adding data blocks to the header of an asynchronous packet. The second and third write requests are different in that the data size of the operand stored in the data block is 4 bytes or not.

As in the write request, the read request can be divided into three types according to the data size of the operand stored in an asynchronous packet, i.e., a read request (data quadlet), a read request (data block: data length=4 bytes), and a read request (data block: data length≠4 bytes).

The transaction response is indicated at the right side of FIG. 12B.

In response to the above-described three types of write requests, a write response or no response is defined.

In response to the read request (data quadlet), a read response (data quadlet) is defined. In response to the read request (data block: data length=4 bytes) or the read request (data block: data length≠4 bytes), a read response (data block) is defined.

In response to the lock request, a lock response is defined.

2-7 Addressing

Figure 13:
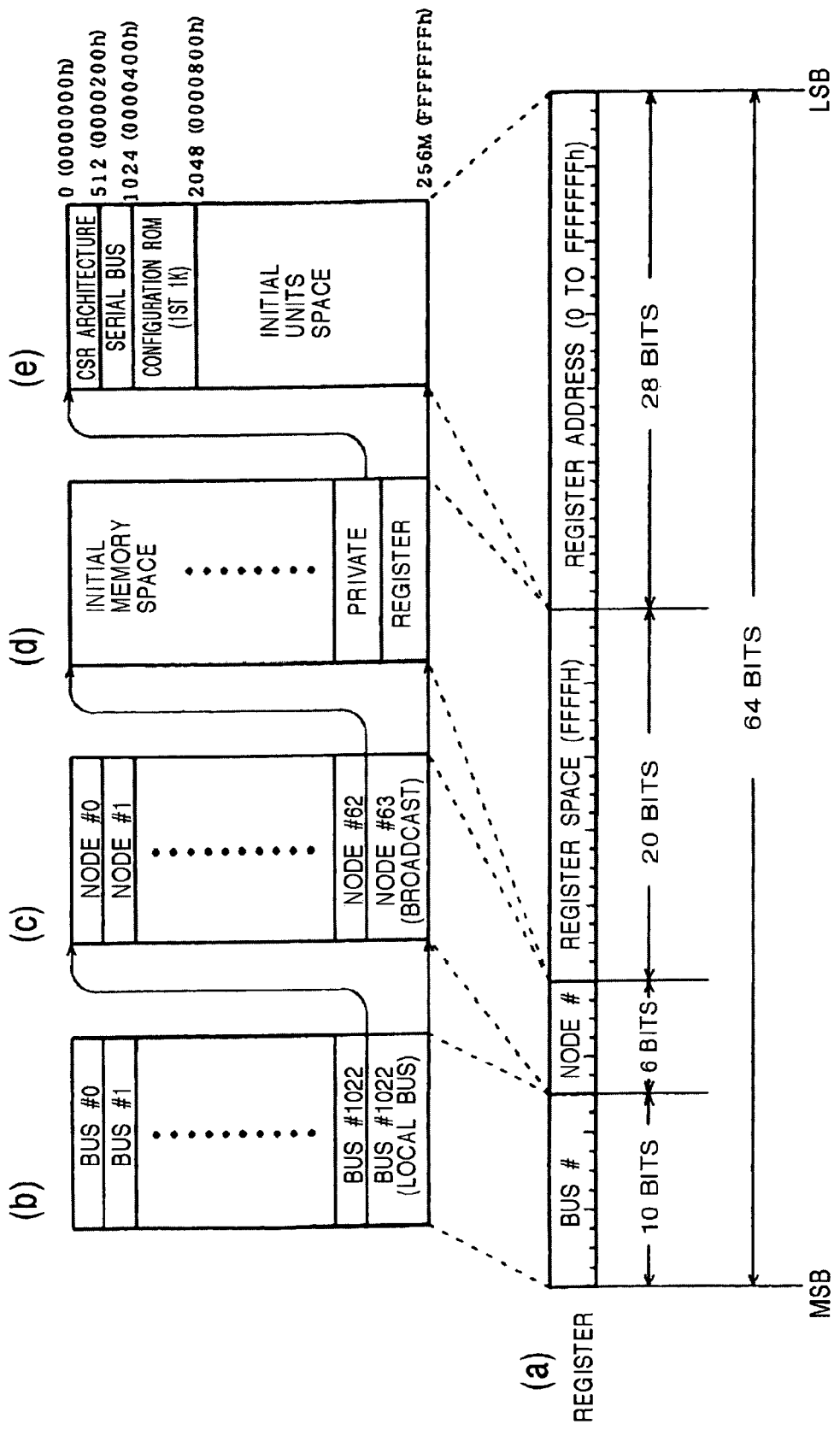
FIG. 13 illustrates an addressing structure of an IEEE1394 bus.

FIG. 13 illustrates an addressing structure of an IEEE1394 bus.

As indicated by (a) of FIG. 13, 64 bits are assigned to a bus address register (address space).

In the highest 10-bit region, bus IDs for identifying IEEE1394 bus lines are indicated. As represented by (b) of FIG. 13, a total of 1023 bus IDs, i.e., bus#0 through bus#1022, are set as bus IDs. The bus#1023 is defined as the local bus.

In the 6-bit region subsequent to the bus address in (a) of FIG. 13, node IDs of devices connected to the corresponding IEEE1394 bus lines represented by the bus IDs are indicated. As indicated by (c) of FIG. 13, a total of 63 node IDs, i.e., node#0 through node#62, can be identified.

A total of 16 bits representing the bus IDs and node IDs correspond to destination IDs stored in the header of an AV/C command packet, which is discussed below. By a combination of the bus ID and node ID, a device connected to a certain bus line can be specified in the IEEE1394 system.

In the 20-bit region subsequent to the node IDs, the register space is defined as indicated by (a) of FIG. 13, and in the subsequent 28-bit region, the register address is defined.

The maximum value of the register space is [F FF FFh], and the register space is represented by as shown in (d) of FIG. 13, and the register content is defined as indicated by (e) of FIG. 13. The register address is represented as shown in (e) of FIG. 13.

To simply describe the register address, by referring to the serial bus-dependent register starting at the address 512 [0 00 02 00h], information concerning the cycle time of the isochronous cycle or unoccupied channels can be obtained.

In a configuration ROM starting at the address 1024 [0 00 04 00h], information concerning a node, such as the node unique ID and subunit ID, is stored.

The node unique ID and the subunit ID are required when establishing a connection relationship between the corresponding device and the IEEE1394 bus connected to each other.

The node unique ID, which is assigned to each device, is device information having 8 bytes. Even among the same device type, there is no device having the same node unique ID.

The subunit ID has information concerning the vender name (module_vendor_ID) indicating the manufacturer name of the corresponding device (node) and the model name (model_ID) indicating the type of device.

As stated above, the node unique ID is assigned to each device, and even among the same device type, there is no device having the same node unique ID.

In contrast, the vendor name is information indicating the manufacturer name of the node, and the model name is information indicating the device type of node. Accordingly, there are devices having the same vendor name and model name.

Thus, by referring to the content of the configuration ROM, the node unique ID assigned to the corresponding node can be identified, and by referring to the subunit ID, the manufacturer and the device type of the node can be identified. Although the node unique ID is essential, the vendor name and mode name are optional and are not necessarily set in the device.

2-8 Common Isochronous Packet (CIP)

Figure 14:
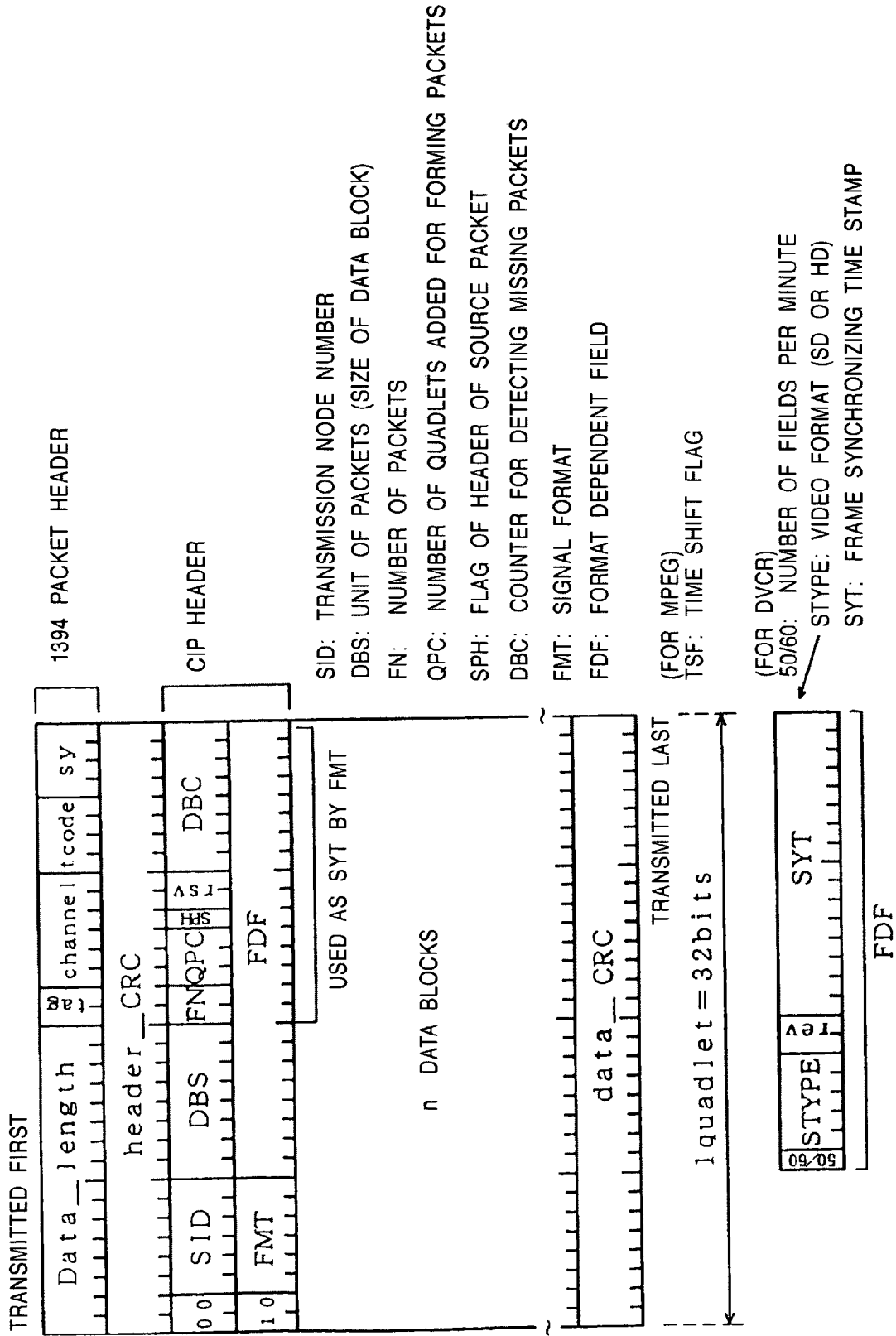
FIG. 14 illustrates a common isochronous packet (CIP)

FIG. 14 illustrates the structure of a common isochronous packet (CIP), that is, the data structure of the isochronous packet shown in FIG. 11.

As discussed above, ATRAC data (audio data), which is one of the recording/playback data compatible with the MD recorder/player 1 of this embodiment, is transmitted and received in the form of isochronous packets by the IEEE1394 communication. That is, the amount of data that can be transmitted in real time is stored in isochronous packets, and are sequentially transmitted in every isochronous cycle.

The first 32 bits (one quadlet) of the CIP are used as a 1394 packet header.

In the 1394 packet header, the highest 16-bit region represents data_length; the subsequent 2-bit region designates tag, the subsequent 2-bit region designates tag; the subsequent 6-bit region represents channel; the subsequent 4-bit region represents tcode; and the subsequent 4-bit region designates sy.

Subsequent to the 1394 packet header, header_CRC is stored by using one quadlet.

Subsequent to the header_CRC, a CIP header is stored by using two quadlets.

In the highest two bits of the upper quadlet of the CIP header, '0' and '0' are stored. In the following 6-bit region, SID (sender node number) is indicated. In the following 8-bit region, DBS (data block size), which is the unit data amount for forming data into packets, is designated. In the subsequent two-bit region, FN (number of divided packets) is indicated, and in the subsequent three-bit region, QPC (the number of quadlets added for dividing data into packets) is designated.

In the following one-bit region, SPH (flag of the header of the source packet) is stored, and in the 8-bit region, DBC (the counter value for detecting missing packets) is stored.

In the highest two bits of the lower quadlet of the CIP header, '1' and '0' are stored. In the subsequent 6-bit region, FMT (signal format (transmission format)) is indicated. The type of data (data format) stored in the CIP can be identified by the value of the FMT. More specifically, the type of data, for example, MPEG stream data, audio stream data, digital video camera (DV) stream data, etc., can be identified. The data formats represented by FMT correspond to transmission protocols, such as the SD-DVCR real time transmission (502), the HD-DVCR real time transmission (503), the SDL-DVCR real time transmission (504), the MPEG2-TS real time transmission (505), and the audio and music real time transmission (506) managed by the CIP header format (501) shown in FIG. 6.

After the FMT region, a 24-bit FDF (format dependent field) region follows. The FDF is a region in which the data format shown as FMT is further classified into details. For example, if the data is audio data, the FDF indicates whether the audio data is linear audio data or musical instrument digital interface (MIDI) data.

In the case of ATRAC data, for example, the FMT indicates that the data is audio stream data, and then, the FDF indicates that the audio stream data is ATRAC data.

If the FMT indicates that the data is MPEG data, synchronizing control information referred to as a "time shift flag (TSF)" is stored in the FDF. If the FMT indicates that the data is digital video camera (DVCR) data, the FDF is defined as shown at the bottom of FIG. 14. More specifically, 50/60 (one bit) defines the number of fields per minute; STYPE (five bits) indicates whether the video format is SD or HD; and SYT designates the frame synchronizing time stamp.

After the CIP header, data defined by FMT and FDF is stored as a sequence of n data blocks. If the FMT and FDF indicate that the data stored is ATRAC data, the ATRAC data is stored as the data blocks.

After the data blocks, data_CRC is disposed.

2-9 Connection Management

In the IEEE1394 format, the connection relationship of devices connected via an IEEE1394 bus is defined by a logical connection concept referred to as "plug".

FIG. 15 illustrates an example of the connection relationship defined by the plug. In this connection relationship, a system mode in which a VCR1, a VCR2, a set-top box (STB: digital satellite broadcast tuner), a monitor device, and a digital still camera are connected to each other via an IEEE1394 bus is shown.

As the connection mode by the IEEE1394 plug, there are two modes, i.e., point-to-point connection and broadcast connection.

In the point-to-point connection, the relationship between the sender and the receiver is specified, and data transmission is performed between the sender and the receiver by using a specific channel.

In contrast, in the broadcast connection, the sender sends data without specifying the receiver or channel. The receiver receives data without identifying the sender, and performs required processing on the received data if necessary.

In the example shown in FIG. 15, as the point-to-point connection, the STB (sender) sends data to the VCR1 (receiver) by using channel#1, and the digital still camera (sender) sends data to the VCR2 (receiver) by using channel#2.

As the broadcast connection, the digital still camera (sender) sends data, and the monitor device receives the data from the digital still camera and performs required response processing.

The above-described connection mode (plug) is established by a plug control register (PCR) disposed in the address space of each device.

Figure 16A:
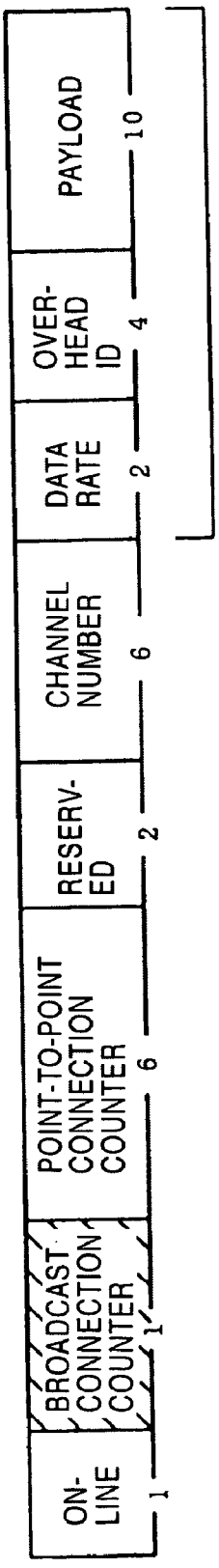
FIGS. 16A and 16B illustrate plug control registers.
Figure 16B:
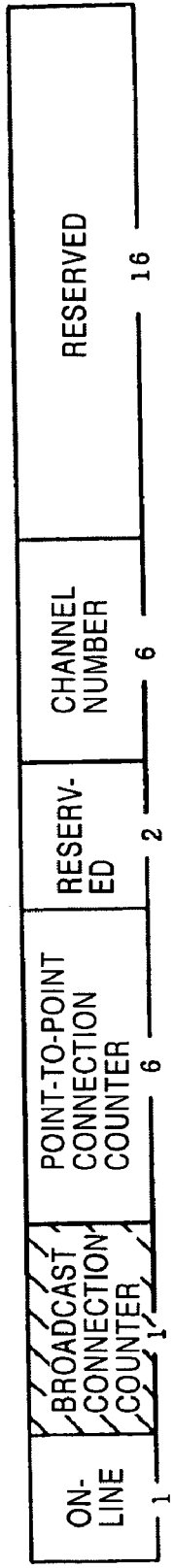

FIG. 16A illustrates the structure of an output plug control register (oPCR[n]) and FIG. 16B illustrates the structure of an input plug control register (iPCR[n]). The sizes of oPCR[n] and iPCR[n] are both 32 bits.

In the oPCR[n] shown in FIG. 16A, if 1 is stored in on-line of the highest one bit, it means that the plug is on-line in which isochronous data can be transmitted. If 1 is stored in the subsequent broadcast connection counter (one bit), data transmission is performed by broadcast connection. The subsequent point-to-point connection counter (6 bits) indicates the number of point-to-point connections linked to this plug. Then, the data can be transmitted from the highest 11th bit by using the channel represented by the channel number (6 bits).

In the iPCR[n] shown in FIG. 16B, if 1 is stored in on-line of the highest one bit, it means that the plug is on-line in which isochronous data can be received. If 1 is stored in the subsequent broadcast connection counter (one bit), data reception is performed by broadcast connection. The subsequent point-to-point connection counter (6 bits) indicates the number of point-to-point connections linked to this plug. Then, the data can be received from the 11th highest bit by using the channel represented by the channel number (6 bits).

In the broadcast connection counter of oPCR[n] and iPCR[n] shown in FIGS. 16A and 16B, the number of nodes that can perform broadcast connection is stored if transmission/reception is performed by using broadcast connection.

In the point-to-point connection counter of oPCR[n] and iPCR[n] shown in FIGS. 16A and 16B, the number of nodes that can perform point-to-point connection is stored if transmission/reception is performed by using point-to-point connection.

2-10 Commands and Responses in FCP

Data transmission by asynchronous communication is defined by the FCP (402) of FIG. 6. Transactions defined by the FCP (402) are as follows.

As the FCP, the write transaction defined in asynchronous communication (see FIG. 12B) is used. Accordingly, AUX data is transmitted in this embodiment by using the write transaction in asynchronous communication according to the FCP.

Figure 17:
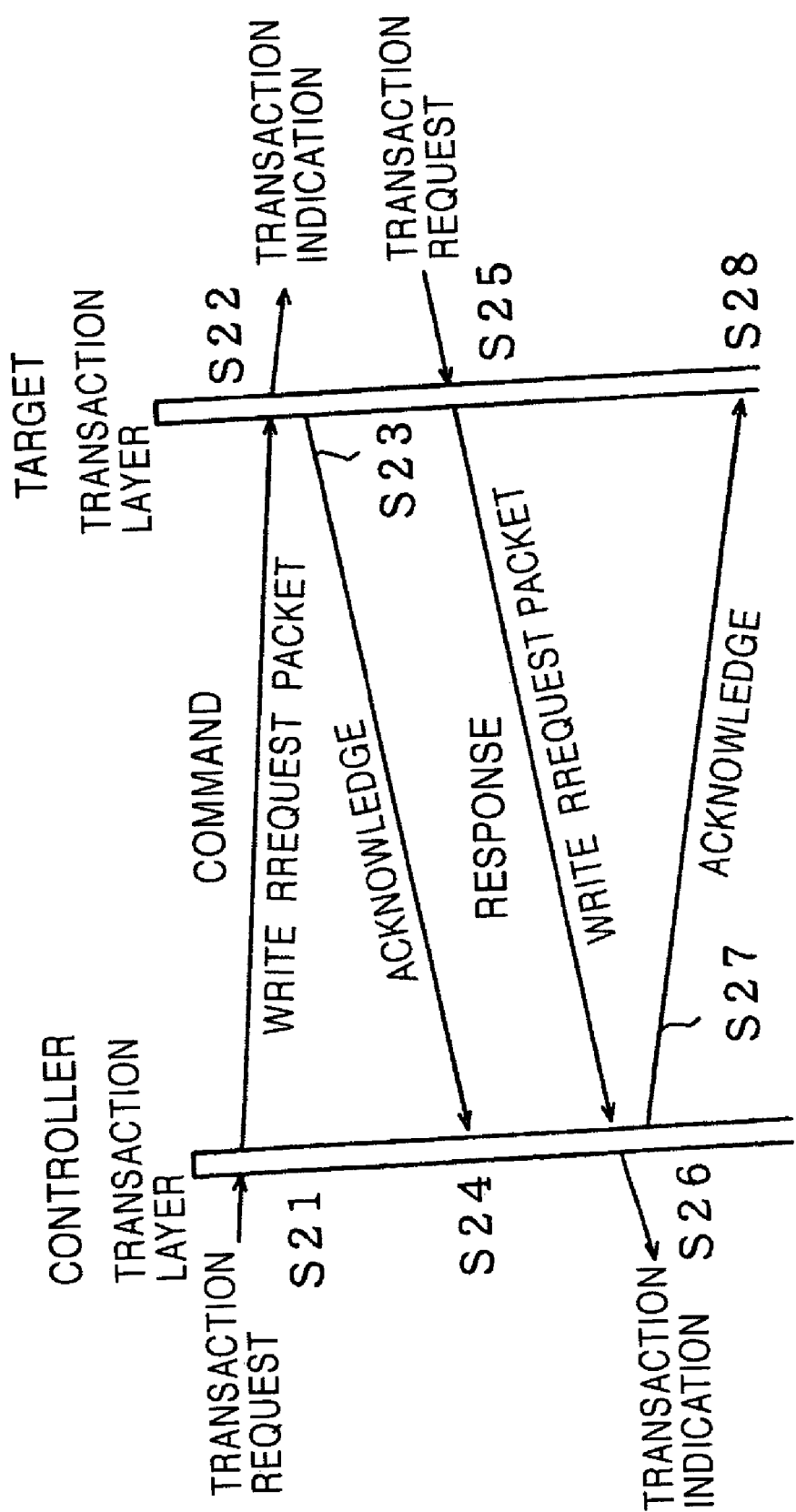
FIG. 17 illustrates write transaction defined in asynchronous communication.

A device that supports the FCP is provided with a command/response register, and implements a transaction by writing a message into the command/response register, as described with reference to the flowchart of FIG. 17.

For performing command sending processing, in step S21, a controller generates a transaction request and sends a write request packet to a target. In step S22, the target receives the write request packet and writes data into the command/response register. Then, in step S23, the target returns acknowledge to the controller. In step S24, the controller receives this acknowledge. Steps 21 through S24 are command sending processing.

Subsequently, for response returning processing, in step S25, the target sends a write request packet. In step S26, the controller receives the write request packet and writes data into the command/response register. In step S27, the controller returns acknowledge to the target in response to the reception of the write request packet. In step S28, the target receives this acknowledge to acknowledge that the write request packet has been received by the controller.

That is, the command sending processing from the controller to the target and the response returning processing from the target to the controller form the base of data transmission (transaction) by the FCP.

2-11 AV/C Command Packets

As discussed with reference to FIG. 6, in asynchronous communication, based on the FCP, communication can be performed to various AV machines by using the AV/C command.

In asynchronous communication, three types of transactions, i.e., write transaction, read transaction, and lock transaction, are defined as discussed with reference to FIG. 12B. In practice, a write request/response packet, a read request/response packet, and a lock request/response packet corresponding to the write transaction, the read transaction, and the lock transaction, respectively, are used. In the FCP, the write transaction is used, as stated above.

Figure 18:
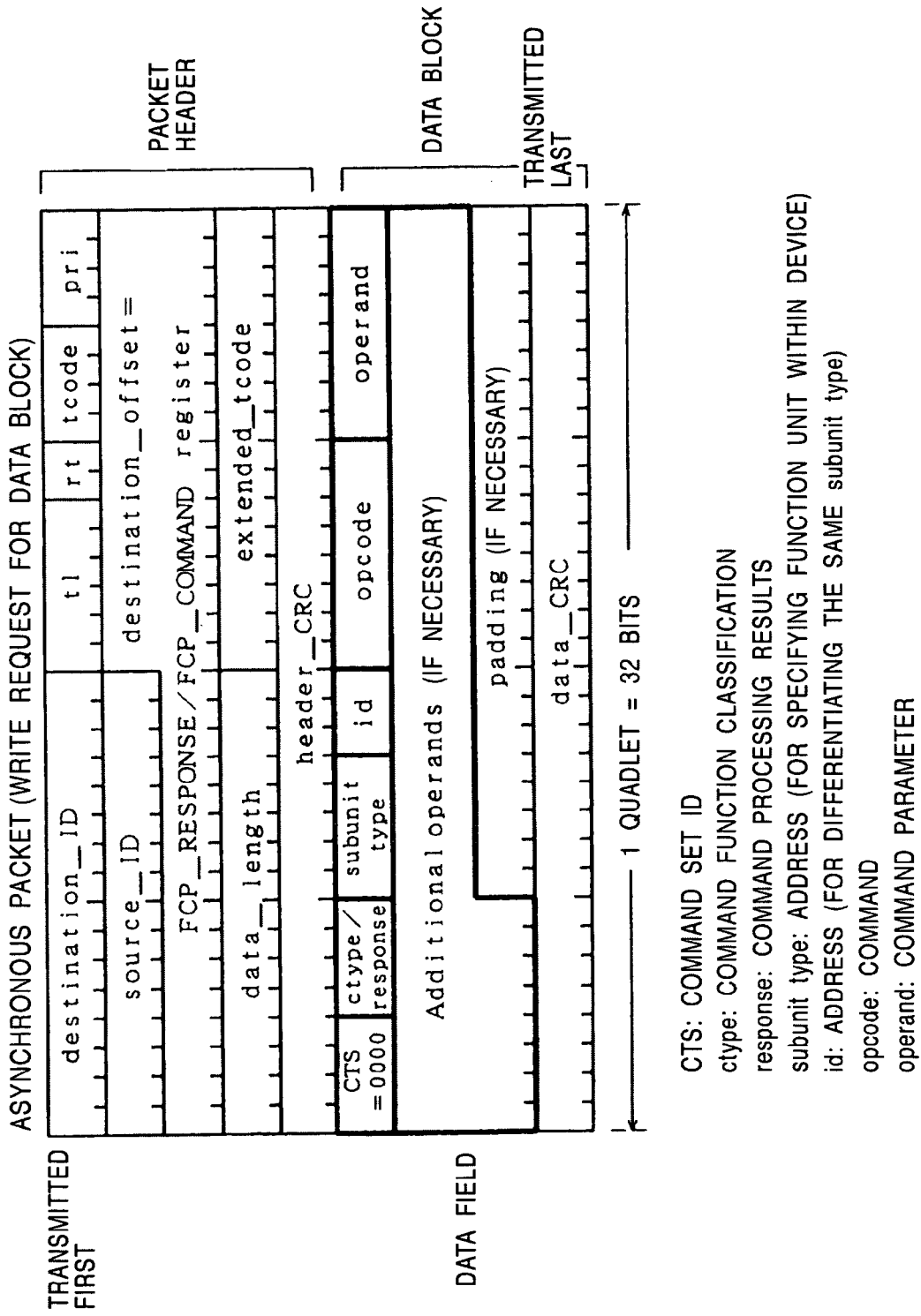
FIG. 18 illustrates a structure of an asynchronous packet (AV/C command packet)

FIG. 18 illustrates the format of the write request packet (asynchronous packet (write request for data block)). In this embodiment, the write request packet is used as the AV/C command packet.

In the write request packet, the first 5 quadlets (first through fifth quadlets) are used as the packet header.

The highest 16 bits of the first quadlet are used for storing destination_ID indicating the node ID of the destination of the data. In the following 6-bit region, tl (transaction label) indicating the packet number is indicated. The subsequent two bits are rt (retry code) indicating whether the packet is to be transmitted for the first time or to be resent. The following 4 bits are tcode (transaction code) indicating the command code. Then, the subsequent 4 bits are pri(priority) indicating the priority of the packets.

In the second quadlet, the highest 16 bits are used for storing source_ID indicating the node_ID of the data sender.

The lower 16 bits of the second quadlet and the entire 48 bits of the third quadlet are used for storing destination_offset indicating the addresses of the command register (FCP_COMMAND register) and the response register (FCP_RESPONSE register).

The above-described destination_ID and the destination_offset correspond to the 64-bit address space defined in the IEEE1394 format.

In the fourth quadlet, the highest 16 bits are used for storing data_length indicating the data size of the datafield (area surrounded by the solid lines in FIG. 18).

In the subsequent lower 16-bit region, extended_tcode used for extending tcode is stored.

The 32-bit region as the fifth quadlet designates header_CRC in which CRC values for performing checksum of the packet header are stored.

From the sixth quadlet after the packet header, data blocks are disposed, and the data field is formed as the head of the data block.

In the highest 4 bits, which are the head of the data field, of the sixth quadlet, CTS (command and transaction set) is indicated. The CTS represents the ID of the command set of the write request packet, and when the CTS is set to be 0000, as shown in FIG. 18, the content indicated in the datafield is the AV/C command. That is, the write request packet is defined as the AV/C command packet. In this embodiment, since the FCP uses the AV/C command, the CTS indicates 0000.

In the 4-bit region after the CTS, ctype/response indicating ctype (command type: command function classification) or command processing result (response) is designated.

FIG. 19 illustrates the definition of the above-described ctype/response.

As the ctype (command), 0000 through 0111 can be used, 0000 is CONTROL, 0001 is STATUS, 0010 is INQUIRY, and 0011 is NOTIFY. 0100 through 0111 are currently undefined (reserved).

CONTROL is a command for externally controlling the function; STATUS is a command for externally querying about the status; INQUIRY is a command for externally querying about the presence or absence of the support for the control command; and NOTIFY is a command for externally notifying a status change.

As the response, 1000 through 1111 are used. 1000 is NOT IMPLEMENTED, 1001 is ACCEPTED, 1010 is REJECTED, 1011 is IN TRANSACTION, 1100 is IMPLEMENTED/STABLE, 1101 is CHANGED, 1100 reserved, and 1111 is INTERIM.

The type of response is changed according to the type of command. For example, in response to the CONTROL command, one of the four commands, i.e., NOT IMPLEMENTED, ACCEPTED, REJECTED, and INTERIM, is selected according to the status of the responder.

In FIG. 18, the 5-bit region subsequent to the ctype/response, subunit-type is stored. The subunit-type indicates the type of subunit (device) of the destination of COMMAND or the sender of RESPONSE. In the IEEE1394 format, the device itself is referred to as a "unit", and the type of functional device unit provided in the unit (device) is referred to as a "subunit". For example, the unit as a VCR includes two subunits, i.e., a tuner for receiving terrestrial waves and satellite broadcasts and a video cassette recorder/player.

Figure 20:
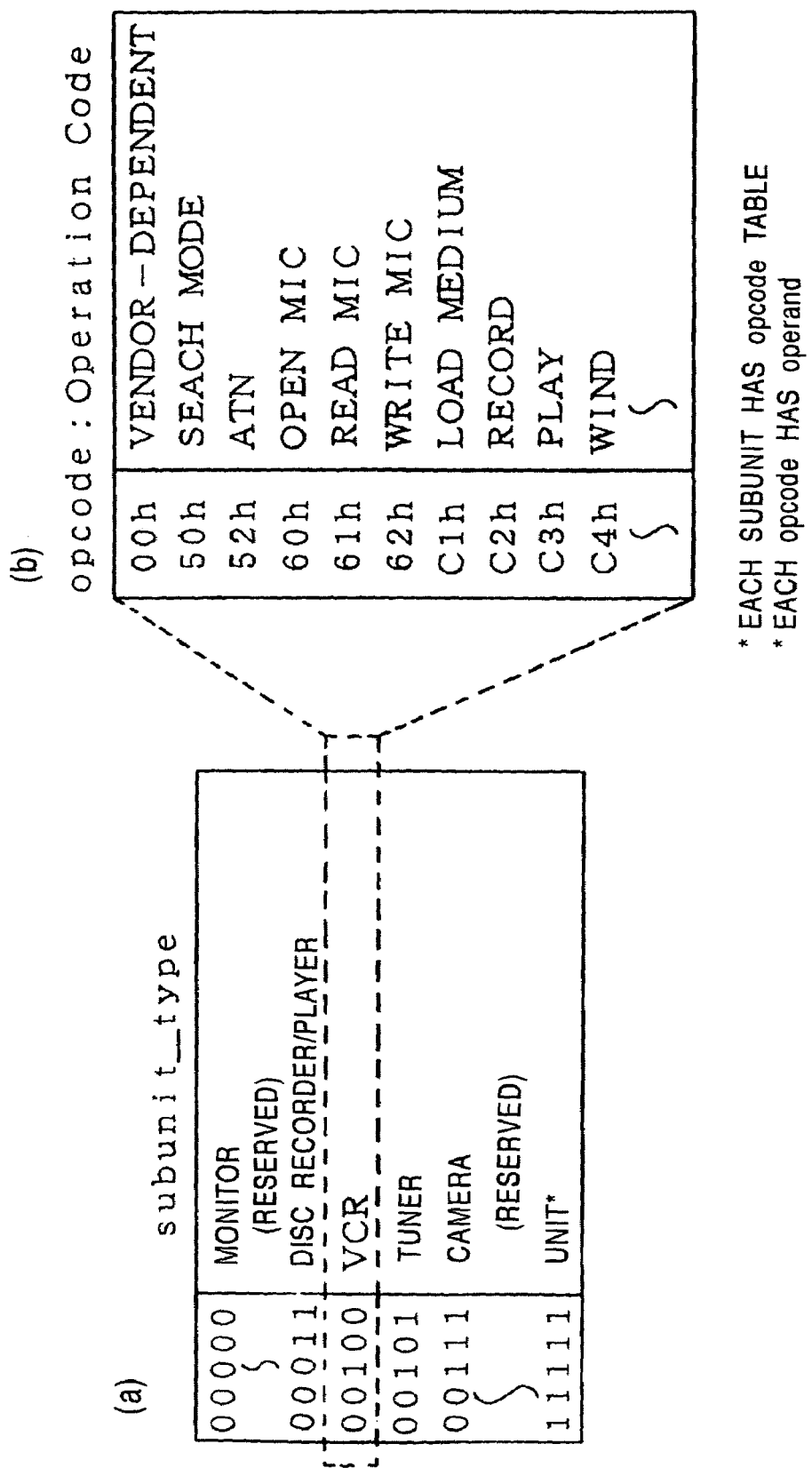
FIG. 20 illustrates the definition of subunit_type and opcode of an asynchronous packet.

The subunit_type is defined, for example, as shown in (a) of FIG. 20. More specifically, 00000 is a monitor, 00001 through 00010 are reserved, 00011 is a disc recorder/player, 00100 is a VCR, 00101 is a tuner, 00111 is a camera, 01000 through 11110 are reserved, and 11111 is a unit without subunit.

In FIG. 18, in the three bits subsequent to the subunit_type, id (node_ID) for specifying each of a plurality of subunits of the same type is stored.

In the subsequent 8 bits, opcode is stored, and in the subsequent 8 bits, operand is stored.

The opcode is an operation code, and in the operand, information (parameters) required for the opcode is stored. The opcode is defined for each subunit and each subunit has a unique opcode list table. For example, if the subunit is a VCR, various commands, such as PLAY and RECORD, are defined in the opcode, as shown (b) of FIG. 20. The operand is defined for each opcode.

As the datafield in FIG. 18, the 32 bits in the sixth quadlet are essential, and if necessary, operands may be added (additional operands).

After the datafield, data_CRC is disposed. If necessary, padding is disposed before data_CRC.

3. SRM

A system renewability message (SRM) is information for copyright protection used for five-companies digital transmission content protection (5C-DTCP)-compatible fully authenticated devices (for example, IEEE1394, universal serial bus (USB), and media oriented system transfer (MOST)). This information includes a blacklist of devices that are not compliant with copyright protection.

SRM is one type of information used (checked) for conducting authentication between devices. In this embodiment, updating of SRM is discussed in detail below by taking this SRM as one of authentication reference information.

Figure 21:
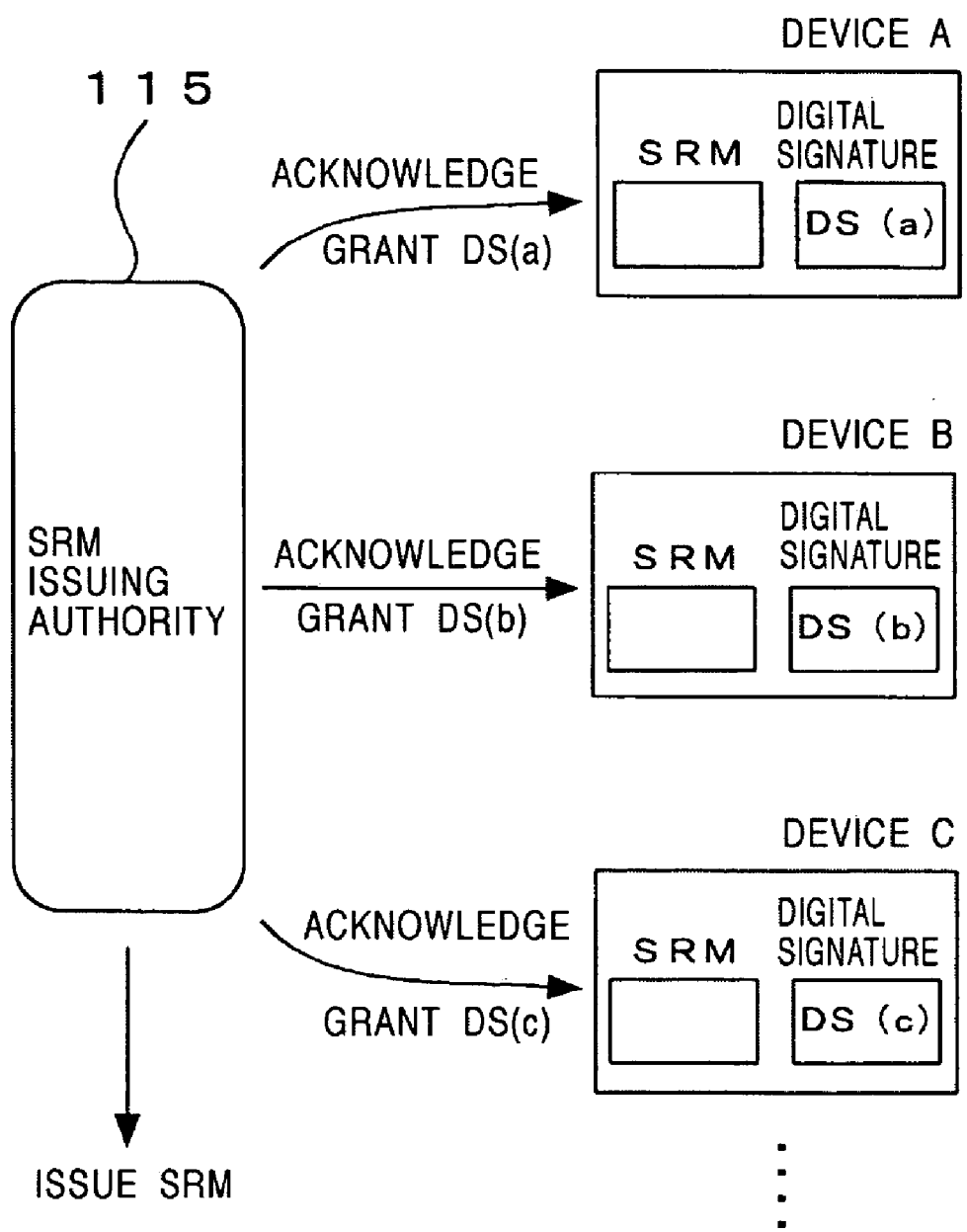
FIG. 21 illustrates issuing of SRM.

Devices A, B, and C shown in FIG. 21 are devices acknowledged (licensed) by an SRM issuing authority 115 as verified 5C-DTCP-compatible devices. The SRM issuing authority 115 issues digital signatures DS (digital certificates) indicating licenses to the acknowledged devices. Devices A, B, and C store digital signatures DS(a), DS(b), and DS(c), respectively, issued by the SRM issuing authority 115 therein.

The SRM issuing authority 115 issues SRMs when necessary, for example, when a device which is not compliant with copyright protection is found.

SRM data includes data, such as type, generation, and version number, as shown in FIG. 22. As the headers of the SRM data, type, generation, version number are provided.

As the certificate revocation list (CRL) length, the length of a CRL is recorded, and then, the CRL is recorded as variable length data. The CRL is information indicating a list of electronic devices whose licenses are canceled by the SRM issuing authority 115, i.e., blacklist information.

A digital signature (digital transmission licensing administrator (DTLA) signature) is also added. This signature is a digital signature for certifying the SRM data as authorized data by the SRM issuing authority 115.

It is now assumed that there is no device listed in a CRL, that is, SRM data is not issued. Then, the SRM issuing authority 115 grants licenses to devices A, B, and C, as shown in FIG. 21.

The SRM issuing authority 115 issues digital signatures DS(a), DS(b), and DS(c) to devices A, B, and C, respectively. Devices A, B, and C store the corresponding digital signatures DS(*) therein.

Since SRM data is not issued, SRM data without real data in the SRM data format, such as that shown in FIG. 22, is stored. In this format, an area for SRM real data may be reserved, or only the headers therefor may be recorded.

For the sake of convenience, SRM data without real data (CRL blacklist) stored in each device is referred to as "SRM data version 0.0").

It is now assumed that the device C is then determined as a device insufficient for copyright protection and that the SRM issuing authority 115 cancels the license granted to the device C. In this case, the SRM issuing authority 115 issues SRM data in which the digital signature DS(c) granted to the device C is listed in a CRL.

For the sake convenience, this SRM data is referred to as SRM data version 1.0. In this case, the devices A and B should update SRM data version 0.0 stored therein to SRM data version 1.0.

Thereafter, the SRM issuing authority 115 issues SRM data, such as version 1.1, 1.2, 2.0, and so on. It is necessary that each device should update SRM data accordingly.

To implement precise copyright protection by conducting updating and suitable authentication, licensed devices must perform:

(1) storing (updating) SRM data in the devices, if necessary, when receiving the SRM data from a communicating device after conducting authentication;

(2) sending SRM data stored in the devices to a communicating device, if necessary, after conducting authentication; and (3) terminating authentication if a communicating device is listed in the CRL of SRM data (authentication error occurred).

The object for these is to immediately exclude products from the market if the copyright protection of the products is not sufficient.

This is discussed in detail with reference to FIGS. 23A, 23B, and 23C.

FIG. 23A illustrates the SRM issuing period and the manufacturing period of devices on the time axis. At a certain time on the time axis, SRM data is version 0.0, which means that there is no device to be listed as a CRL. That is, SRM data is not yet issued.

Then, at a certain time, device A is manufactured, and the SRM issuing authority 115 grants a digital signature DS(a) to the device A as a license. In the device A, the digital signature DS(a) is recorded, as shown in FIG. 23B, and the SRM data stored therein is version 0.0.

Then, at a certain time, device C is manufactured, and the SRM issuing authority 115 grants a digital signature DS(c) to the device C as a license. In the device C, the digital signature DS(c) is recorded, as shown in FIG. 23C, and the SRM data stored therein is version 0.0.

Thereafter, however, the license of the device C is canceled, and the SRM issuing authority 115 issues SRM data 1.0 in which the device C is listed in a CRL.

After issuing the SRM data 1.0, device B is manufactured, and if the SRM data 1.0 has been informed to the manufacturer before manufacturing the device B, the SRM data 1.0 can be stored in the device B. For example, the SRM data 1.0 in which the digital signature DS(c) of the device C is listed in a blacklist is stored in the device B, as shown in FIG. 23B.

Under this circumstance, the devices A and B are connected via an IEEE1394 bus 116 (see FIG. 24), as shown in FIG. 23B, and mutual authentication is conducted to establish communication therebetween.

As stated above, since licensed devices must send and receive SRM data after conducting authentication, the device B sends the SRM data 1.0 to the device A. The device A updates the SRM data 0.0 stored therein since the SRM data 1.0 is newer than the SRM data 0.0. Accordingly, the SRM data 1.0 in which the digital signature DS(c) of the device C is listed in a blacklist is stored in the device A, as shown in FIG. 23B.

Thereafter, at a certain time, the devices A and C are connected via the IEEE1394 bus 116 to establish communication, as shown in FIG. 23C. However, since the digital signature DS(c) of the device C is listed in the CRL of the SRM data, the device A does not authenticate the device C (authentication error). That is, communication between the devices A and C is not established, and audio data is not sent or received.

In this manner, an authentication error has occurred in the device C whose license is canceled. Thus, devices having insufficient copyright protection can be excluded, thereby maintaining a copyright protection function.

In this situation, to correctly exclude unsuitable devices, SRM data must be quickly updated in each device.

Accordingly, as discussed above, SRM data is sent and received when conducting authentication, and if necessary, the SRM data can be updated.

For inputting a new version of SRM data into a device by a user, an electronic device and a computer may be connected via the IEEE1394 bus 116, and an application is started in the personal computer to send SRM data to the electronic device.

If the personal computer can receive SRM data issued via a network communication, or if the SRM data is provided in a CD-ROM, the SRM data stored in the electronic device can be updated via the personal computer.

4. SRM Input/Update Processing 4-1 Input/Update Processing System Configuration

As described above, in the state in which a plurality of devices are connected to each other via the IEEE1394 bus 116, if the latest version of SRM data is stored in one of the devices, the other devices can update SRM data stored therein to the latest version.

If devices are still being manufactured, the manufacturer can store the latest version of SRM data in the devices.

However, in order to quickly and efficiently supply SRM data, which is irregularly issued, to existing devices and to update it, it is preferable that SRM data be input into devices in a variety of input paths and that the opportunity to update the SRM data be increased.

As a result of increasing the number of input paths, an older version of SRM data and a new version of SRM data may be input irregularly, or such SRM data may be simultaneously input from a plurality of input paths. Such situations must be dealt with suitably.

Thus, in an electronic device of this embodiment, a variety of input paths for SRM data can be implemented, and also, such input SRM data can be suitably updated without being influenced by the variety of input paths.

Examples of a variety of input paths are described below. Devices that can play back disks, such as the disk drive 30, are discussed first.

SRM data is input from an external device via the IEEE1394 bus 116, and also, SRM data is recorded in the disk 91, and when playing back the disk 91, the SRM data can also be obtained as playback data.

In a disk, for example, in an SACD, content, such as music content, is recorded, and the latest SRM data is recorded in the disk 91 by a manufacturer and is put into market.

Then, when a user purchases the disk 91 and installs it into the disk drive 30 owned by the user, the disk drive 30 can read the SRM data recorded on the disk 91 and input it into the disk drive 30.

Figure 5:
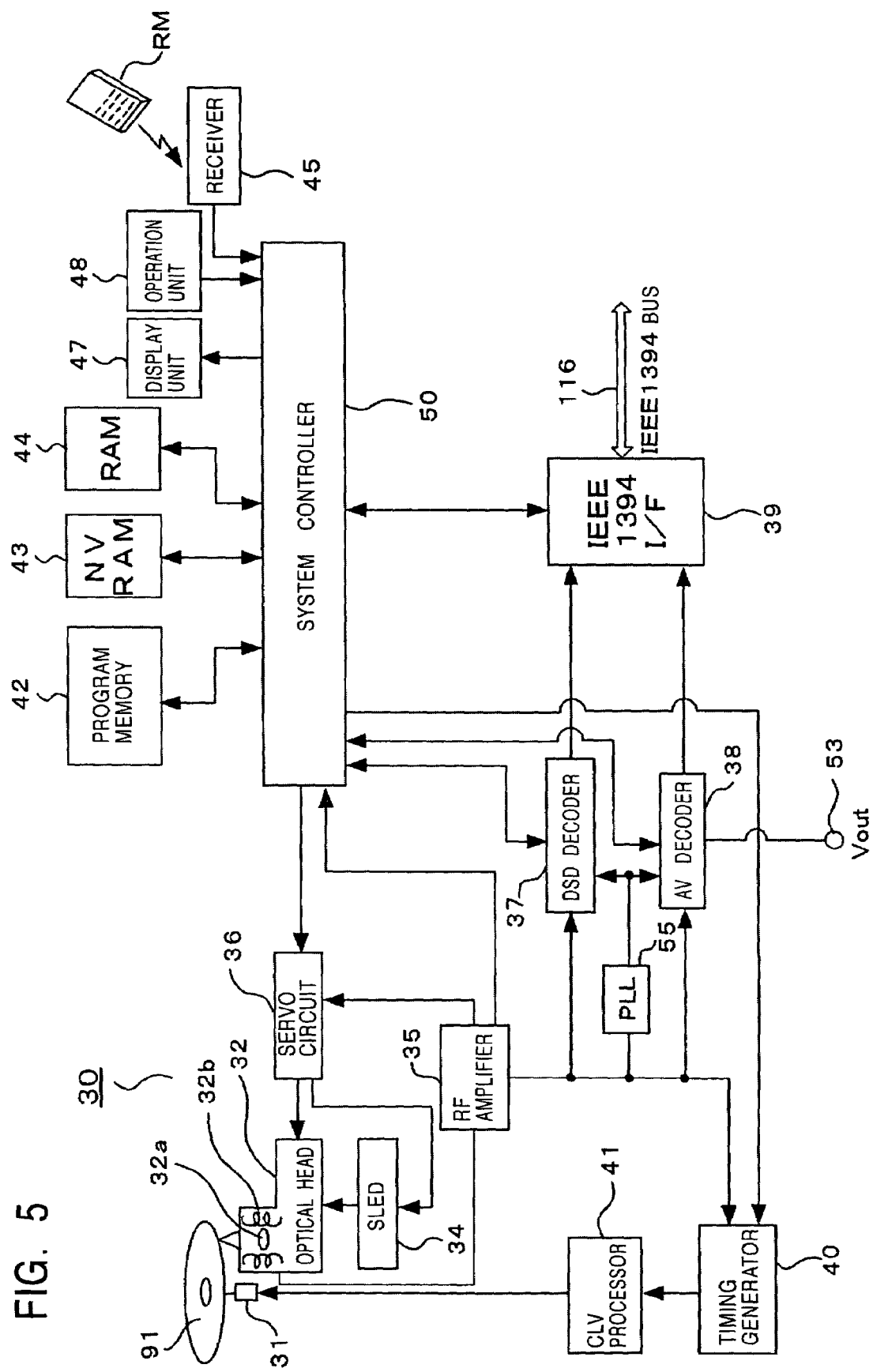
FIG. 5 is a block diagram illustrating the internal configuration of the STR-compatible disk drive.
Figure 24:
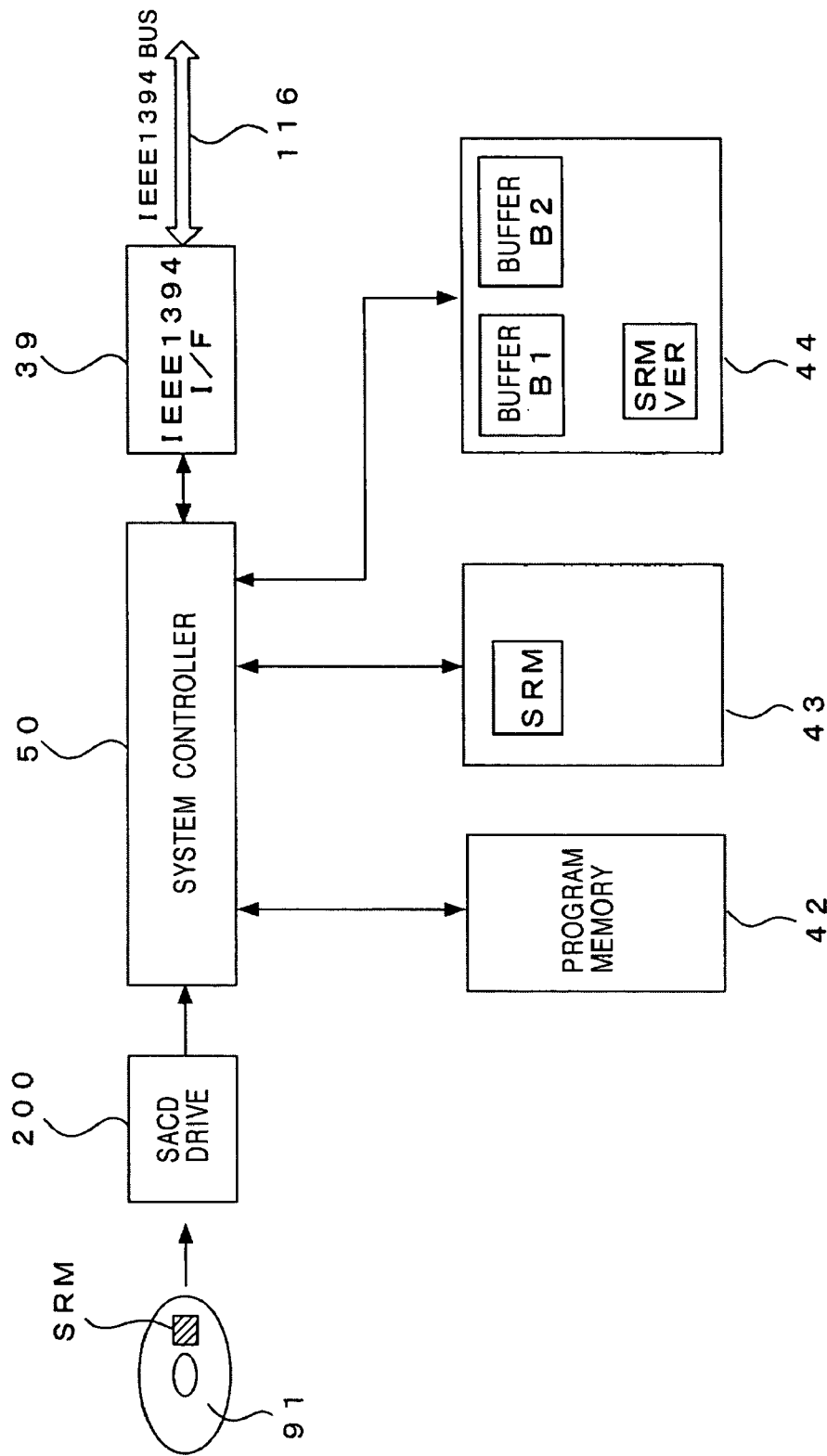
FIG. 24 is a block diagram for inputting and updating SRM according to an embodiment of the present invention.

FIG. 24 is a diagram illustrating part of the blocks of the disk drive 30 shown in FIG. 5 related to SRM data extraction.

More specifically, the system controller 50, the IEEE1394 interface 39, the NV-RAM 43, the RAM 44, the program memory 42, and an SACD drive 200 are shown in FIG. 24. The SACD drive 200 is a mechanism/circuit system for playing back the disk 91 (SACD), and includes the optical head 32, the servo circuit 36, the RF amplifier 35, the DSD decoder 37, the spindle motor 31, and so on, as shown in FIG. 5.

FIG. 24 schematically illustrates that SRM data is recorded on the disk 91 (SACD).

SRM data can be considered as part of management information, such as the TOC or subcodes of the disk. Then, as discussed with reference to FIG. 5, the SRM data is extracted together with the other management information by the DSD decoder 37, and is supplied to the system controller 50. In FIG. 24, the SRM data is input from the SACD drive 200 to the system controller 50 through such a path.

The SRM data is stored in, for example, the NV-RAM 43. In the program memory 42, programs executed by the system controller 50, for example, a program for inputting/updating SRM data, are stored.

The RAM 44 is normally used as a work area for the system controller 50, and in this case, it is used as a buffer area required for input/update processing of SRM data.

For example, a buffer B1 is used as a buffer area for SRM data input via the IEEE1394 bus 116, and a buffer B2 is used as a buffer area for SRM data read from the disk 91.

Figure 25B:
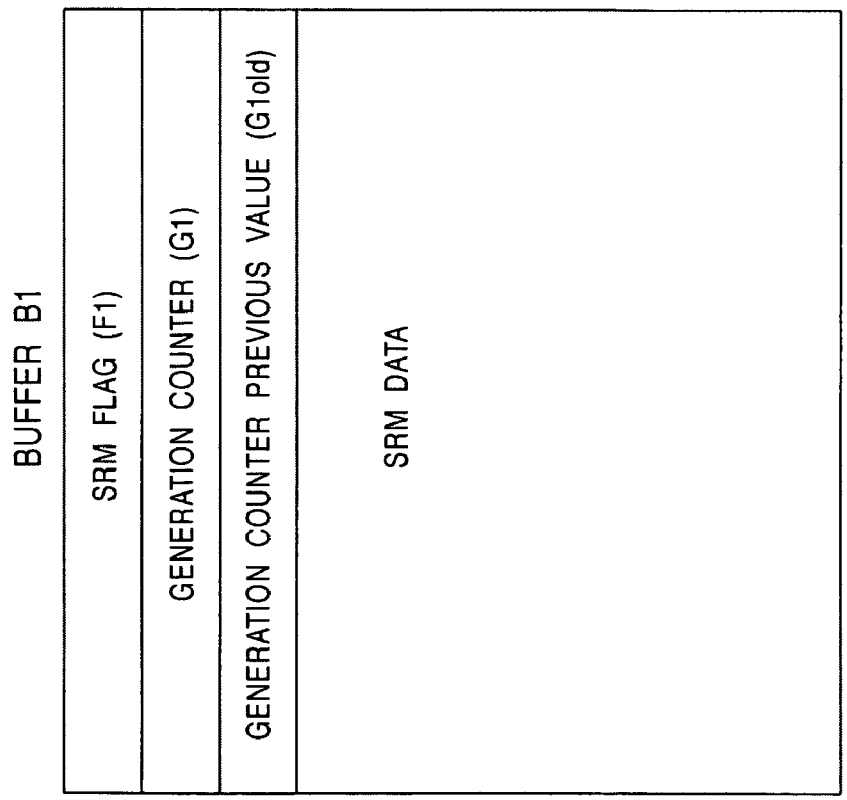
FIGS. 25A and 25B illustrate buffers in which SRM is stored.
Figure 25A:
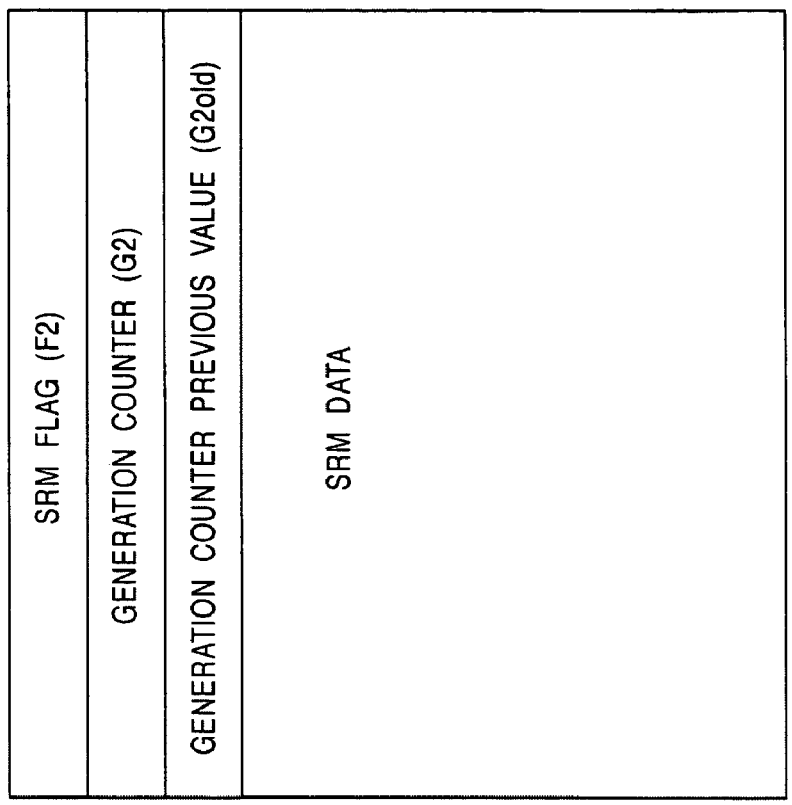

Storage areas, such as those shown in FIGS. 25A and 25B, are reserved in the buffers B1 and B2.

In the buffer B1, as shown in FIG. 25A, regions for an SRM flag F1, a generation counter G1, and a generation counter previous value G1old are reserved, and a buffer region for SRM data input via the IEEE1394 bus 116 is reserved.

In the buffer B2, as shown in FIG. 25B, regions for an SRM flag F2, a generation counter G2, and a generation counter previous value G2old are reserved, and a buffer region for SRM data read from the disk 91 is reserved.

The SRM flag F1 or F2 indicates that new SRM data is stored in the buffer B1 or B2.

The generation counter G1 or G2 is set to be 0 when the device is powered ON, and counts up every time SRM data is input. Accordingly, the generation counter G1 or G2 indicates the generation of the SRM data stored in the buffer B1 or B2 after the device is powered ON.

The values of the generation counters G1 and G2 are copied into the generation counter previous values G1old and G2old at a certain point.

4-2 Initializing Processing

Figure 26:
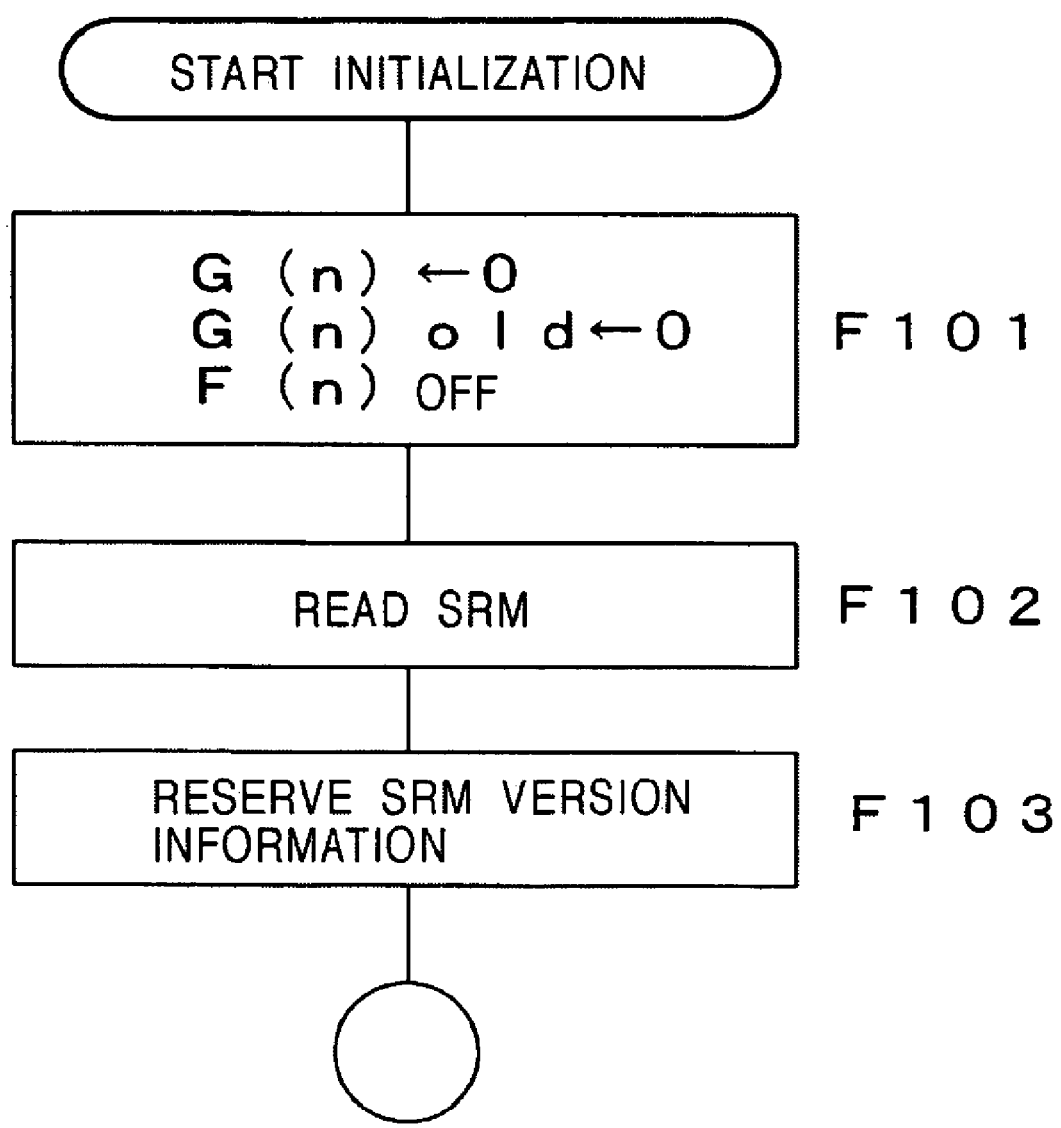
FIG. 26 is a flowchart illustrating initializing processing.

The initializing processing for SRM data in the disk drive 30 is described below with reference to the flowchart of FIG. 26. This processing is executed by the system controller 50 when the disk drive 30 is powered ON.

In step F101, the SRM flag F(n) is turned OFF, and the generation counter G(n) and the generation counter previous value G(n)old are set to be 0.

If, for example, two input paths are provided for SRM, i.e., if two buffers B1 and B2 are provided, the SRM flags F1 and F2 are turned OFF, and the generation counters G1 and G2 and the generation counter previous values G1old and G2old are set to be 0.

In step F102, SRM data stored in the NV-RAM 43 is read and is expanded into the RAM 44.

Then, in step F103, the version information of the current SRM data is reserved. The initializing processing is then completed.

4-3 SRM Input Processing

The processing performed by the system controller 50 when receiving SRM data is described below with reference to the flowchart of FIG. 50.

In most cases, SRM data is separately transmitted by being divided into small portions according to the transfer capacity of a bus or the communication situation.

The system controller 50 determines in step F201 whether the input of SRM data is started. If the outcome of step F201 is YES, the system controller 50 determines the input source (sender) in step F202. More specifically, in the example shown in FIG. 24, the system controller 50 determines whether the SRM data has been from a communicating device via the IEEE1394 bus 116 or it has been read from the disk 91 and has been received from the SACD drive 200. Then, the system controller 50 sets a determination result to be n, which corresponds to the buffer B(n) (buffer B1 or buffer B2). In this embodiment, when SRM data is input via the IEEE1394 bus 116, the buffer B1 is selected, and when SRM data is input from the disk 91, the buffer B2 is selected.

In step F203, the input SRM data is written into the buffer B(n) associated with the selected input source.

The system controller 50 then determines in step F204 whether all the SRM data have been input.

If the result of step F204 is NO, the system controller 50 determines in step F205 whether an input error is occurring due to, for example, the interruption of the input of the SRM data, because, for example, the connection cable of the IEEE1394 bus 116 has been removed or a reading error has occurred on the disk.

If it is determined in step F205 that an input error is occurring, the SRM buffering processing is terminated.

If it is determined in step F204 that the input of the SRM data has been completed, the process proceeds to step F206 in which the SRM flag F(n) is turned ON.

In step F207, the generation counter G(n) is incremented.

By executing the above-described processing every time SRM data is input, SRM data, which is irregularly input, can be stored in the buffer B1 or B2.

For example, upon completing authentication with a device connected via the IEEE1394 bus 116, SRM data is transmitted. Then, by executing the processing shown in FIG. 27, the SRM data is stored in the buffer B1.

Figure 27:
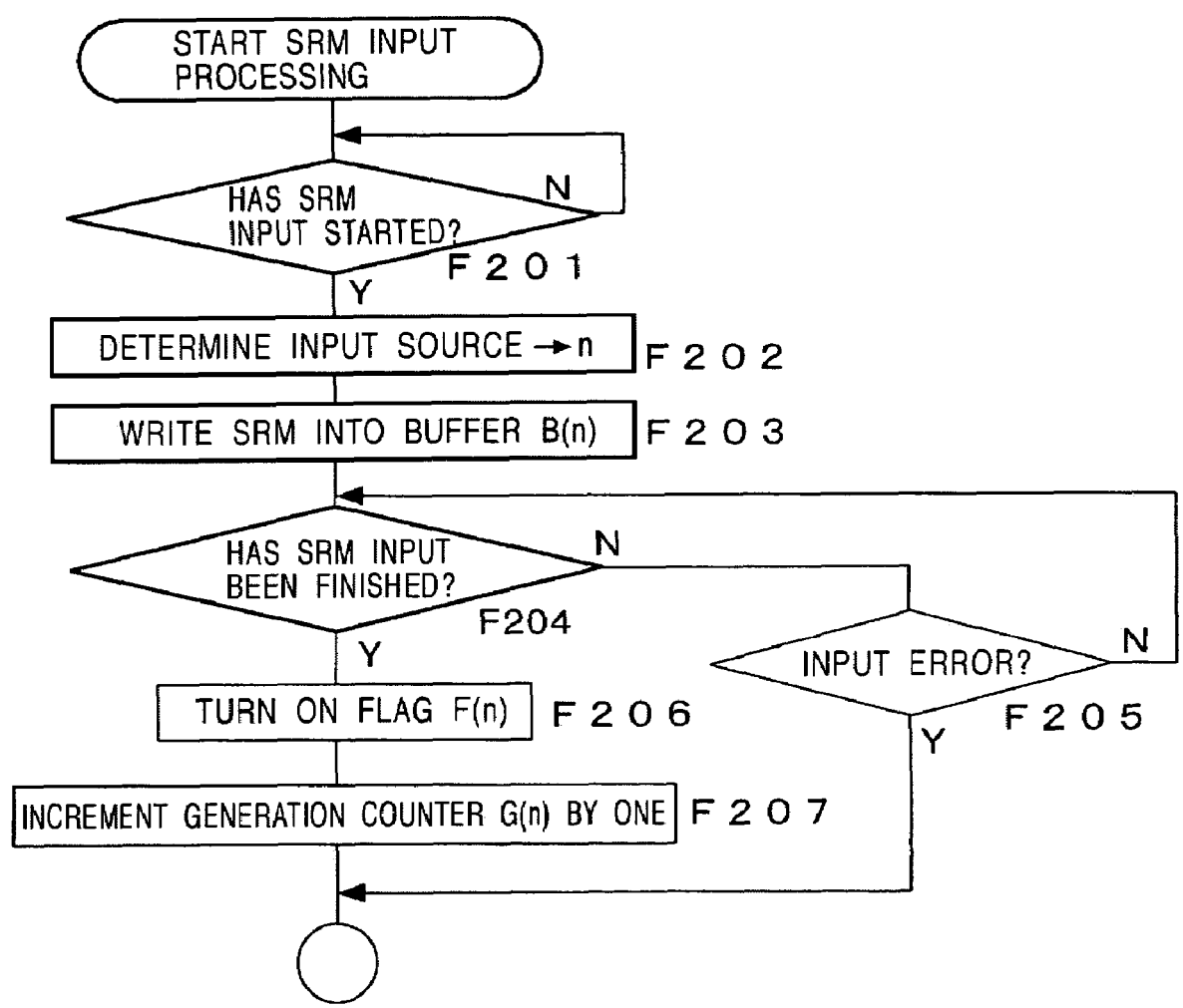
FIG. 27 is a flowchart illustrating SRM input processing.

If the user installs the disk 91 having SRM data recorded thereon, the SRM data is read from the disk 91 and is input into the disk drive 30. Then, the processing shown in FIG. 27 is executed to store the input SRM data in the buffer B2.

Figure 30:
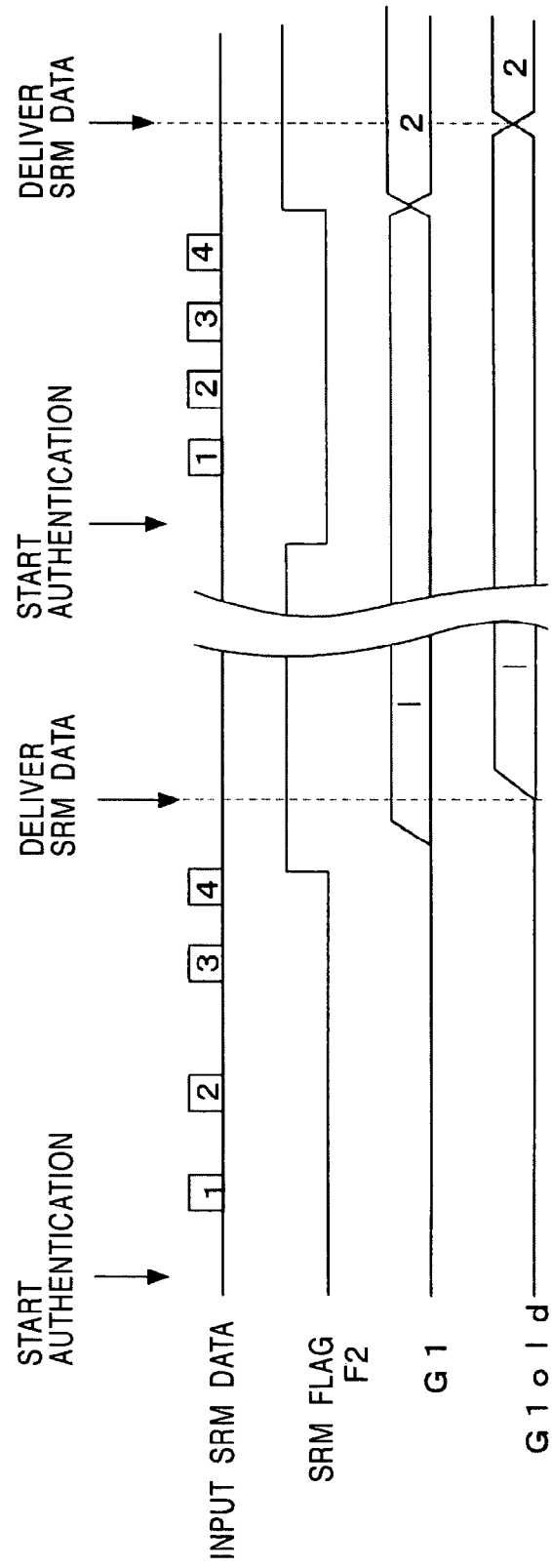
FIGS. 30 and 31 are timing charts illustrating SRM input/update processing.
Figure 31:
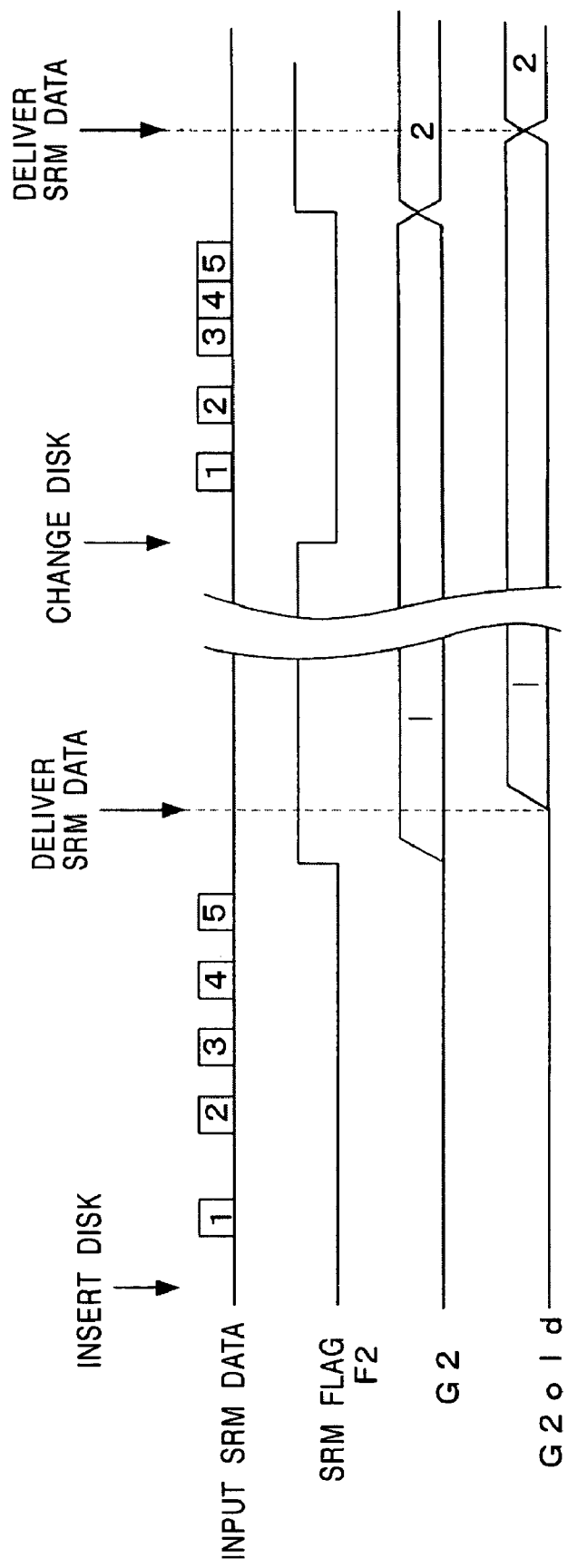

FIGS. 30 and 31 are timing charts illustrating the input of SRM data.

FIG. 30 illustrates that SRM data is input via the IEEE1394 bus 116. The disk drive 30 conducts authentication processing with a communicating device, and immediately after authentication, SRM data is separately transmitted from the communicating device by being divided into four portions, as indicated by 1, 2, 3, and 4 in FIG. 30.

The data portions indicated by 1, 2, 3, and 4 are sequentially stored in the buffer B1. When the entire SRM data is stored, steps F206 and F207 are performed to turn ON the SRM flag F1 and to set the generation counter G1 to be 1.

When the buffered SRM data is delivered to the system controller 50 in the processing shown in FIG. 29, which is described below, the value of the generation counter G1 is copied into the generation counter previous value G1old.

The SRM flag F1 is turned OFF when it is likely that subsequent SRM data is input. If the SRM data is input via the IEEE1394 bus 116, the SRM flag F1 is turned OFF when authentication is started.

For example, when the disk drive 30 starts authentication with another device connected with the disk drive 30 via the IEEE1394 bus 116, the SRM flag F1 is turned OFF, as shown in FIG. 30. After authentication, SRM data is separately sent by being divided into four portions indicated by 1, 2, 3, and 4 in FIG. 30, and then, they are sequentially stored in the buffer B1 by performing the processing shown in FIG. 27. When the entire SRM data is stored, steps F206 and F207 are executed to turn on the SRM flag F1 and to count up the generation counter G1 to 2.

FIG. 31 illustrates that SRM data is played back from the disk 91 and is input from the SACD drive 200.

When the disk 91 is installed in the disk drive 30, the TOC is read, and simultaneously, the SRM data is read and is input into the system controller 50. Then, the SRM data is separately sent by being divided into five data portions indicated by 1, 2, 3, 4, and 5 in FIG. 31.

The data portions are sequentially stored in the buffer B2. When the entire SRM data is stored, steps F206 and F207 are executed to turn on the SRM flag F2 and to count up the generation counter G2 to 1.

As in FIG. 30, when the buffered SRM data is delivered to the system controller 50 by the processing shown in FIG. 29, which is discussed below, the value of the generation counter G2 is copied into the generation counter previous value G2old.

The SRM flag F2 is turned OFF when it is likely that subsequent SRM data is input. If the SRM data is input from the disk 91, the SRM flag F2 is turned OFF when disks are changed, that is, when the disk 91 is ejected and a new disk is installed.

For example, by the replacement of disks, the SRM flag F2 is turned OFF, as shown in FIG. 31. Thereafter, SRM data is read from the new disk 91 and is separately input by being divided into five data portion, as indicated by 1, 2, 3, 4, and 5 in FIG. 31, and then, the data portions are sequentially stored in the buffer B2 by executing the processing shown in FIG. 27. When the entire SRM data is stored, steps F206 and F207 are executed to turn ON the SRM flag F2 and to count up the generation counter F2 to 2.

Figure 28:
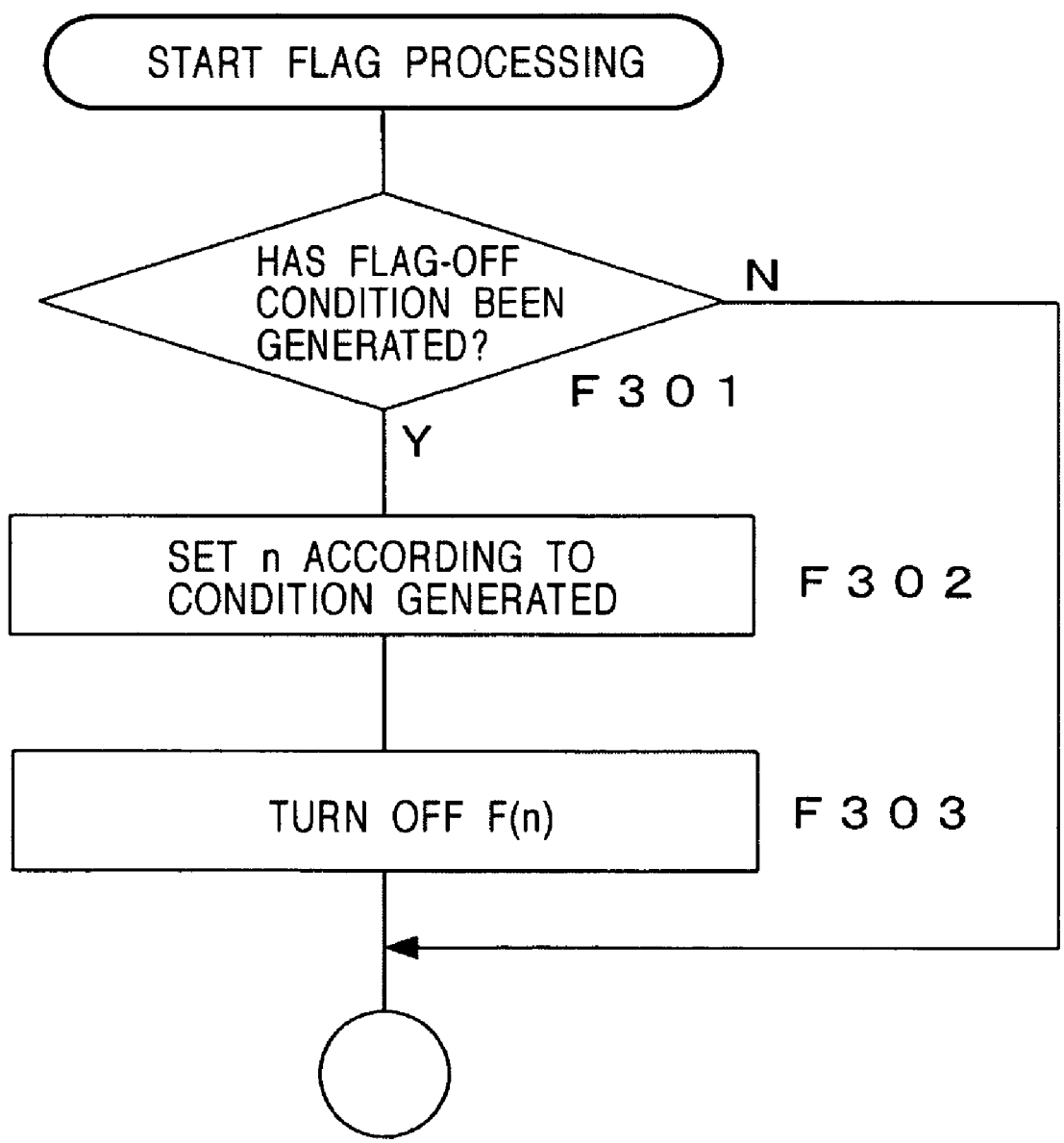
FIG. 28 is a flowchart illustrating flag processing.

As stated above, the SRM flags F1 and F2 are turned OFF when it is likely that new SRM data is input in each input path. To implement this, the processing performed by the system controller 50 is shown in FIG. 28.

In step F301, the system controller 50 monitors whether a condition for turning OFF the flag is generated. The outcome of step F301 becomes YES when, for example, authentication is started with another device or when the disks 91 are changed.

If such a condition is generated, the system controller 50 sets n depending on the generated condition in step F302, that is, the system controller 50 selects the buffer B1 or B2. Then, in step F303, the SRM flag F(n) is turned OFF.

Accordingly, if authentication is started, the SRM flag F1 of the buffer B1 is turned OFF, and if disks are changed, the SR flag F2 of the buffer B2 is turned OFF.

Alternatively, the SRM flag F(n) may be turned OFF when the buffered SRM data is delivered to the system controller 50 or is updated in the SRM update processing, which is discussed below.

4-4 SRM Update Processing

Every time SRM data is input by the SRM input processing shown in FIG. 27, it is buffered in the buffer B1 or B2 in each input path. SRM update processing shown in FIG. 29 is performed on the buffered SRM data.

Figure 29:
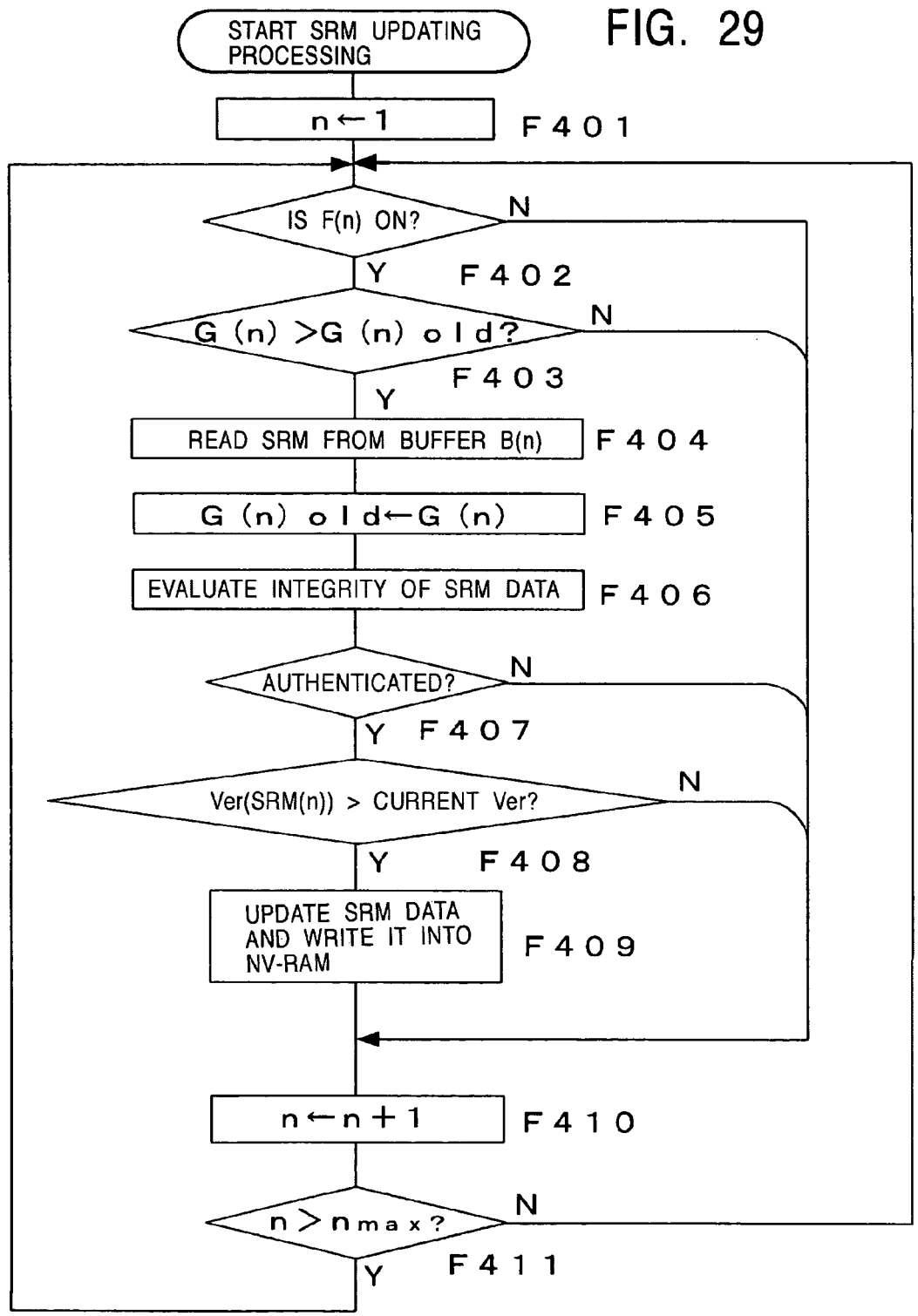
FIG. 29 is a flowchart illustrating SRM update processing.

The system controller 50 regularly executes the processing starting from step F401 of FIG. 29.

In step F401, the system controller 50 sets a variable n to be 1. As stated above, the variable n is a variable for selecting the buffer B(n), and in the example shown in FIG. 24, since two buffer areas, i.e., buffers B1 and B2, are provided, n becomes 1 or 2. In this case, the maximum value nMAX is 2.

Then, in step F402, the system controller 50 determines whether the SRM flag F(n) is ON. Since n is 1, the SRM flag F1 is checked.

If it is determined in step F402 that the SRM flag F(n) is ON, the system controller 50 compares the generation counter G(n) with the generation counter previous value G(n) old. In this case, it is determined whether G1>G1old.

If it is determined in step F402 that the SRM flag F1 is OFF when n is 1, or if it is determined in step F403 that G1 is not greater than G1old even though the SRM flag F1 is found to be ON, there is no SRM data in the buffer B1 that has to undergo the SRM update processing.

In this case, the process proceeds to step F410 in which the variable n is incremented. The system controller 50 then determines in step S411 whether the variable n exceeds the maximum value nMAX. If the outcome of step S411 is NO, the process returns to step F402. In this case, since the variable n is 2, the process returns to step F402. Then, in step S402, it is determined whether the SRM flag F2 is ON, and if so, it is determined in step S403 whether the generation counter G2 is greater than the generation counter previous value G2old.

If the outcome of step F402 or F403 is NO, there is no SRM data in the buffer B2 that has to undergo the SRM update processing. Thus, the process proceeds to step F410 in which the variable n is incremented. Since the variable n becomes 3, it is determined in step F411 that the variable n exceeds the maximum value nMAX. Thus, the process returns to step F402. That is, the flag F1 and the generation counter G1 are again checked.

In this manner, the SRM update processing shown in FIG. 29 is performed alternately on the buffer B1 and the buffer B2.

If the result of step F402 or F403 becomes YES, it means that unprocessed SRM data is stored in the buffer B(n). Accordingly, in step F404, the system controller 50 receives the SRM data stored in the buffer B(n).

This corresponds to the time at which the SRM data is delivered in FIGS. 30 and 31. FIGS. 30 and 31 show that the SRM flag F(n) is ON and G(n)>G(n)old immediately before the SRM data is delivered to the system controller 50.

Subsequently, in step F405, the system controller 50 copies the value of the generation counter G(n) into the generation counter previous value G(n)old. This is also shown in FIGS. 30 and 31.

Accordingly, when it is determined in step F403 that G(n)>G(n)old, new SRM data is buffered and is not yet delivered to the system controller 50 for update processing.

The system controller 50 then determines in step F406 whether the integrity of the SRM data delivered from the buffer B(n) has been verified.

For example, the digital signature (DTLA signature) recorded in the SRM data as described with reference to FIG. 22 is checked to determine whether the SRM data is authorized data.

If the integrity of the SRM data is not verified in step F407, the process proceeds to step F410 without updating the data.

If the SRM data is found to be authorized data in step F407, the process proceeds to step F408. In step F408, the version of the SRM data is compared with the version of the currently stored SRM data to determine whether the input data is newer than the currently stored SRM data.

If the result of step F408 is NO, it is not necessary to update the SRM data, and the process proceeds to step F410.

If the input SRM data is found to be newer than the currently stored SRM data in step S408, the process proceeds to step F409. In step F409, the system controller 50 overwrites the SRM data stored in the NV-RAM 43 by the input SRM data.

The SRM data buffered in the processing shown in FIG. 27 is updated by the processing shown in FIG. 29. Accordingly, the following advantages are obtained in the disk drive 30 so that the SRM data can be updated suitably and quickly.

SRM data can be input from a plurality of input paths so that the opportunity to input SRM data is increased. Accordingly, upon issuing a new version of SRM data, the SRM data can be input quickly.

Since SRM data can be input through a path other than the IEEE1394 bus 116, devices compatible with the IEEE1394 bus 116 do not have to be provided. Particularly, in this embodiment, new SRM data can be widely distributed by storing it in the disk 91.

To further increase the opportunity to input SRM data, a more variety of input paths are preferably used so as to quickly update SRM data.

SRM data input through a plurality of input paths are stored in buffers provided for the corresponding input paths. The system controller 50 always checks the buffered SRM data according to the processing shown in FIG. 29. Then, only when the validity and the version of SRM data are verified, the SRM data is updated. Thus, inappropriate update processing is not performed, for example, SRM data is not updated to SRM data which is not authenticated, or SRM data is not updated to the older version.

In most cases, SRM data is separately transmitted by being divided into small data portion, as shown in FIGS. 30 and 31. If SRM data are simultaneously input through a plurality of paths, data may be mixed. However, by ensuring buffer areas for the corresponding input paths, SRM data can be correctly input without causing data missing.

It can be determined from the generation counter G(n) and the generation counter previous value G(n)old whether buffered SRM data should be delivered to the system controller 50 so as to be updated. This enhances the processing efficiency without updating the same buffered SRM data many times.

4-5 Examples of SRM Input Paths

Figure 32:
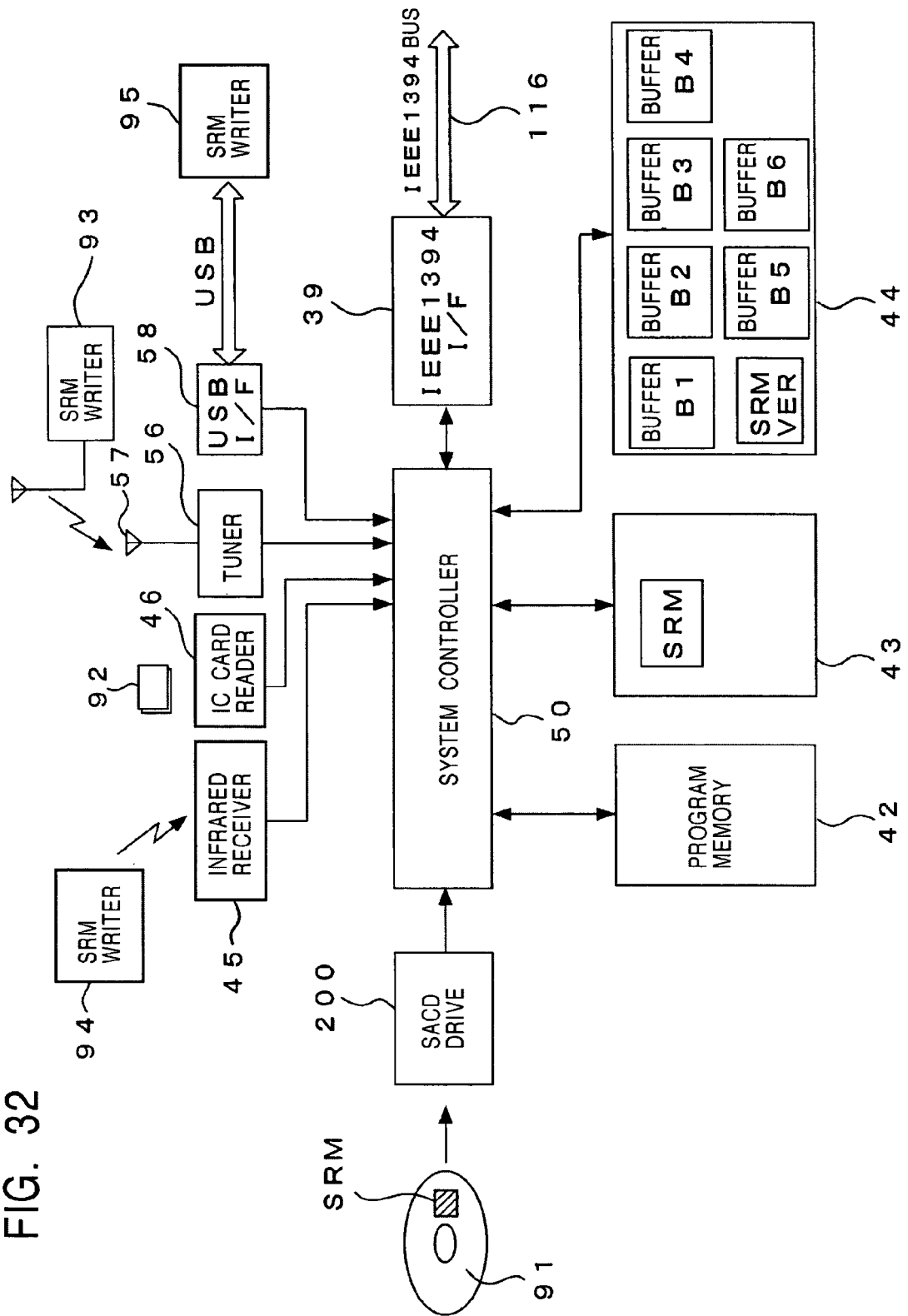
FIG. 32 is a block diagram illustrating a variety of SRM input paths.

FIG. 32 illustrates an example in which four SRM data input paths are provided for the STR disk drive 30 configured as shown in FIG. 24.

The disk drive 30 is provided with the receiver 45 for receiving operation commands from the remote controller RM, as shown in FIG. 5. If this receiver 45 is used as an infrared receiver, it can receive SRM data from an SRM writer 94 for transmitting SRM data by infrared, as shown in FIG. 32. For example, in the configuration shown in FIG. 5, SRM data can be received by the receiver 45 as an infrared signal and is supplied to the system controller 50. That is, the infrared receiver 45 shown in FIG. 32 implements an SRM data input path.

In FIG. 32, an IC card reader 46 is disposed. The IC card reader 46 is a device for reading information from a card medium, for example, an IC card or a memory card, in a contact or non-contact manner.

If, for example, SRM data is stored in an IC card 92 and is provided, the IC card reader 46 can read the SRM data.

An antenna 57 and a tuner 56 are also shown in FIG. 32. The tuner 56 receives and demodulates SRM data sent from an SRM writer 93 and provides it to the system controller 50.

For example, the tuner 56 is formed as an FM/AM radio tuner, and a broadcast station serves as the SRM writer 93, and superimposes SRM data on a radio broadcast signal and sends it. This makes it possible to widely distribute the SRM data by radio broadcasting, and enables an electronic device to receive and update the SRM data.

The tuner 56 is not restricted to a radio tuner, and various types of tuners can be considered, for example, the tuner 56 may be a television tuner for receiving television broadcasts or satellite broadcasts, a tuner for SRM data transmission/reception-compatible frequencies, or a tuner for short-distance radio communication, for example, Bluetooth®.

When paths for inputting SRM data by radio communication are implemented, and when a wide-area broadcast entity, for example, a radio broadcast station, serves as the SRM writer 93, the distribution of new SRM data can be enhanced.

In FIG. 32, a USB interface 58 is also disposed, and is connected with an external device, which serves as an SRM writer 95, via a USB cable.

Accordingly, SRM data used for authentication in an IEEE1394 bus connection can be input from a device connected via another type of interface, for example, a USB. The other types of connections, for example, MOST and control-A1, can also be considered.

SRM data can be input by using an interface other than an IEEE1394 interface. Accordingly, a device, for example, a personal computer or an electronic device, which is not compatible with an IEEE1394 bus can serve as the SRM writer 95.

Although a USB, which is an external bus, is shown in FIG. 32, SRM data may be received and updated via an internal bus, for example, IIC, UART, ISA, or PCI.

In FIG. 32, an infrared input path, a card-medium input path, a radio-transmission input path, and an input path via an interface other than an IEEE1394 bus are shown by way of example. Thus, six input paths including the above-described four input paths, an input path via the IEEE1394 bus 116, and an input path from the disk 91, are provided.

In this case, buffers B1 through B6 are reserved in the RAM 44 for the corresponding input paths.

Then, SRM data from each input path is buffered in the buffer B(n) by executing the processing shown in FIG. 27.

According to the update processing shown in FIG. 29, the buffers B1 through B6 are sequentially checked, and then, the validity and the version of the buffered SRM data are checked, and if necessary, the SRM data is updated.

By providing a variety of SRM data input paths, the opportunity to input SRM data is increased, and the input SRM data can be buffered without confusion and is updated if necessary. Accordingly, for example, in the disk drive 30, SRM data can be updated suitably and quickly, thereby implementing a proper copyright protection function.

A greater variety of input paths for SRM data can be considered. An increased variety of input paths diversifies the types of SRM writers. That is, as discussed above, infrared or radio transmitters and USB-compatible devices can serve as the SRM writers. This is useful not only for updating SRM data by the user, but also for writing SRM data before shipping products by manufacturers.

That is, the writing of SRM data is possible without the need to provide a device compatible with an IEEE1394 bus. Accordingly, SRM data can be written (initialized) through the most efficient path including an IEEE1394 bus. This is very effective in decreasing the time required for shipping products including the development of SRM writers, thereby enhancing the efficiency and facility of the operation.

4-6 SRM Sending Processing when being Updated

As a result of the above-described SRM update processing, the disk drive 30 can update SRM data stored in the NV-RAM 43 within the disk drive 30. It is preferable, however, in terms of the system that the disk drive 30 can send new SRM data to external devices via a path other than an IEEE1394 bus.

Figure 33:
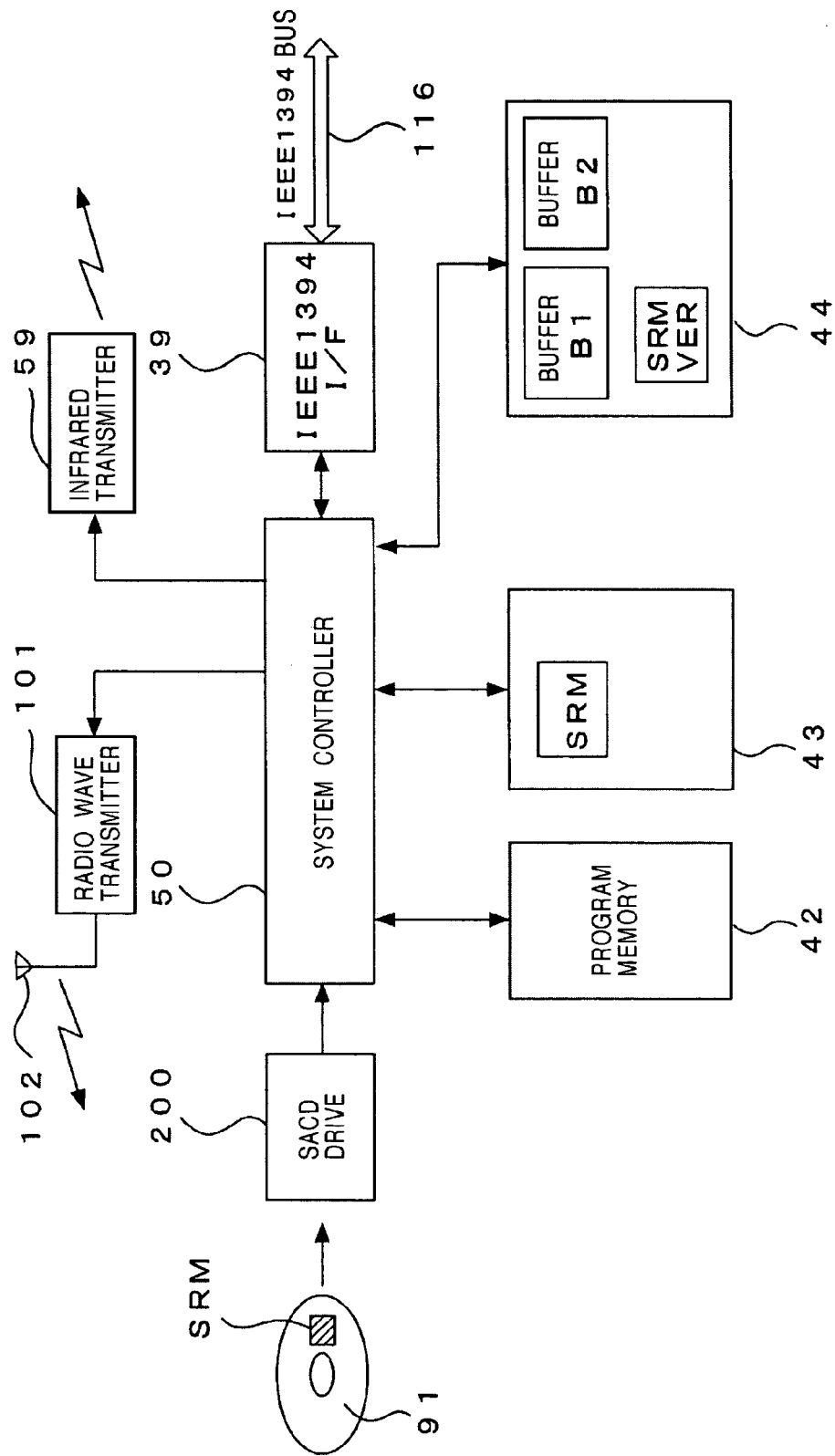
FIG. 33 is a block diagram illustrating a system for sending SRM.

FIG. 33 illustrates an example in which a SRM data transmitter is provided. In this system, a radio transmitter 101, an antenna 102, an infrared transmitter 59 are added to the configuration shown in FIG. 24.

The radio transmitter 101 transmits SRM data to an external device from the antenna 102 under the control of the system controller 50.

The infrared transmitter 59 sends SRM data to an external device as an infrared modulation signal under the control of the system controller 50.

Figure 34:
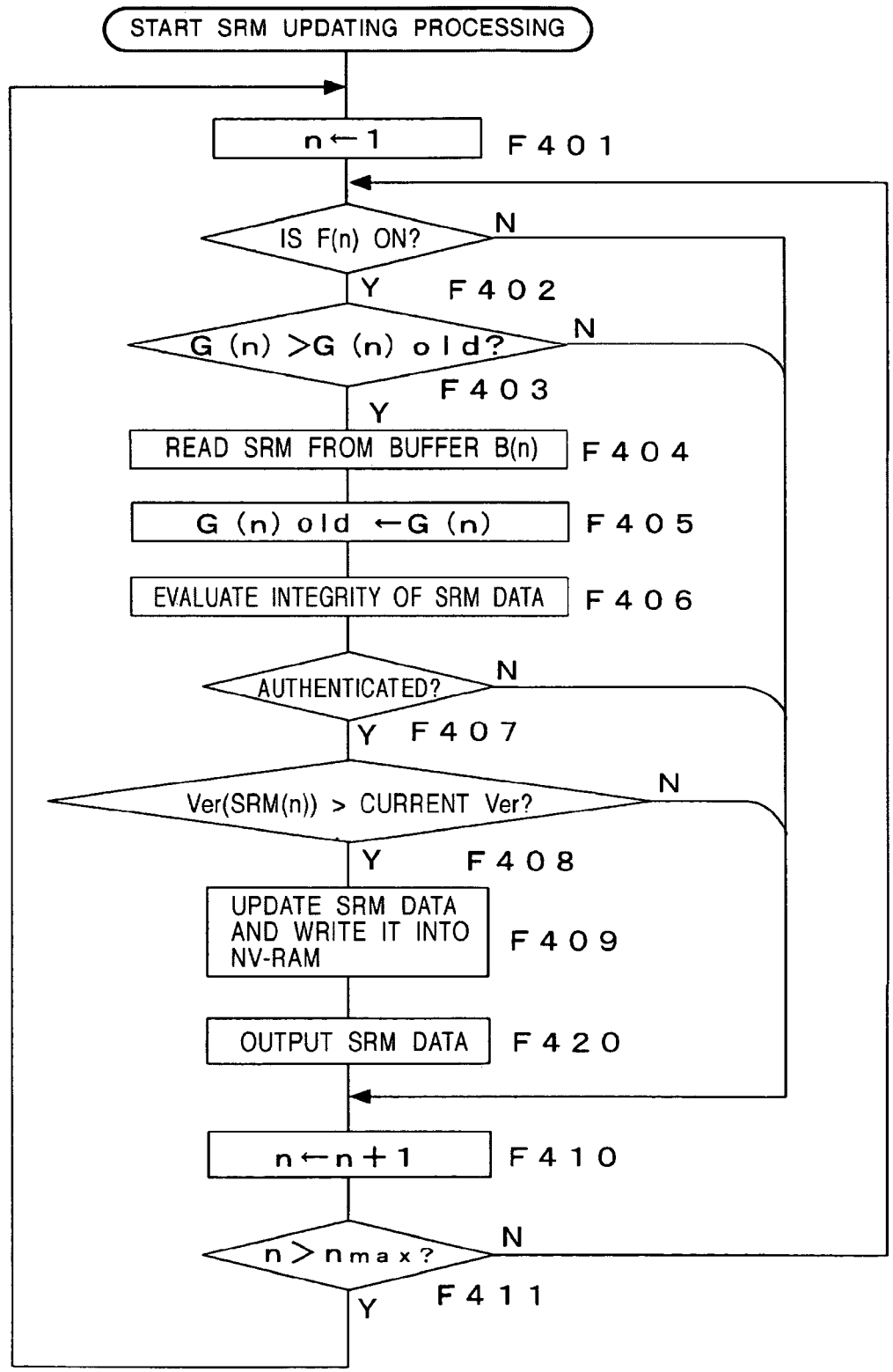
FIG. 34 is a flowchart illustrating SRM update processing including SRM outputting.

In this case, the system controller 50 performs SRM update processing shown in FIG. 34. In FIG. 34, the same processes as those of FIG. 29 are designated with the same step numbers, and an explanation thereof is thus omitted.

As described above, in the SRM update processing, SRM data stored in the buffer B(n) of the RAM 44 is checked and, if necessary, it is updated. In the processing shown in FIG. 34, however, after updating SRM data in the NV-RAM 43 in step F409, it is output in step F420.

That is, in step F420, the system controller 50 supplies the new SRM data, which serves as the updated data, to the radio transmitter 101 and/or the infrared transmitter 59, and allows them to modulate the SRM data and send it to an external device via radio or infrared.

In this case, if a device connected to the disk drive 30 via the IEEE1394 116, as shown in FIG. 1, (or is disposed around the disk drive 30 without being connected) is provided with the tuner 56 or the infrared receiver 45, as shown in FIG. 32, it can receive SRM data.

That is, the disk drive 30 shown in FIG. 33 serves as the SRM writer 93 or 94 shown in FIG. 32.

As stated above, basically, the disk drive 30 sends SRM data via the IEEE1394 bus 116 to devices connected via the IEEE1394 bus 116 when conducting authentication with the devices. As shown in FIG. 34, by quickly sending SRM data to peripheral devices by radio or infrared when performing update processing, the devices can update the SRM data, which is favorable for copyright protection. For example, in the system shown in FIG. 1, after establishing connection by conducting authentication, the disk drive 30 receives new SRM data from the disk 91 and stores it (performs update processing), the SRM data can also be updated in peripheral devices if it is sent to them.

In step F420, the SRM data is transmitted via radio or infrared. However, the SRM data may be transmitted via the IEEE1394 bus 116 to devices if a connection and communication state is established between the disk drive 30 and the devices via the IEEE1394 bus 116. In this case, even if such devices are not provided with an SRM input path via infrared or radio, the SRM data can be transmitted to the devices.

The SRM data may be transmitted to devices connected with another interface, for example, a USB, as shown in FIG. 32, via a transmission path corresponding to that interface.

The electronic device and the method for updating authentication reference information are described in the context of the disk drive 30 and the SRM data update processing performed by the disk drive 30. However, the present invention can be applied to another type of device, for example, the STR 60.

The STR 60 can perform communication via an IEEE1394 bus, and is also provided with the tuner 77, as discussed with reference to FIG. 4. Accordingly, not only the input path for receiving SRM data via an IEEE1394 bus, but also, an input path for receiving SRM data by the tuner 77 can be implemented. Another input path for receiving SRM data via the receiver 89 can also be implemented.

Accordingly, the system controller 70 controls the RAM 75 to reserve buffer areas for such input paths and to store SRM data by performing the processing shown in FIG. 27. Also, the SRM data stored in the NV-RAM 74 can be updated if necessary by performing the SRM update processing shown in FIG. 29.

The STR 60 may be provided with a sending function so as to perform the processing shown in FIG. 34.

The STR 60 may be provided with an IC card reader or an interface, such as a USB, as shown in FIG. 32, so that a more variety of input paths can be implemented in the STR 60.

The present invention can also be applied to the first devices 100 and the second devices 110 shown in FIG. 1.

What is claimed is:

1. An electronic device, comprising:
a memory configured to store first authentication information;
a first interface configured to communicate with an external electronic device connected to the electronic device via a data bus;
an authentication unit configured to conduct authentication processing with the external electronic device by exchanging the stored first authentication information and receiving second authentication information from the external electronic device;
a second interface configured to receive third authentication information;
a first buffer memory configured to store the second authentication information received from the external electronic device, set a first flag in response to the storage of the second authentication information, and increment a first generation counter in response to the storage of the second authentication information;
a second buffer memory configured to store the third authentication information received via the second interface, set a second flag in response to the storage of the third authentication information, and increment a second generation counter in response to the storage of the third authentication information;
an update control unit configured to compare, when the first flag is set, the incremented value of the first generation counter against a previous value of the generation counter stored in the first buffer memory, compare a version of the second authentication information to a version of the stored first authentication information when the incremented value of the first generation counter is greater than the previous value of the generation counter stored in the first buffer memory and update the first authentication information stored in memory based on the second authentication information when it is determined that the version of the second authentication information is newer than the stored first authentication information; and
the update control unit configured to compare, when the second flag is set, the incremented value of the second generation counter against a previous value of the generation counter stored in the second buffer memory, compare a version of the third authentication information to a version of the stored first authentication information when the incremented value of the second generation counter is greater than the previous value of the generation counter stored in the second buffer memory and update the first authentication information stored in memory based on the third authentication information when it is determined that the version of the third authentication information is newer than the stored first authentication information.

2. The electronic device according to claim 1, wherein the update control unit is configured to check validity of the content of the second and third authentication information stored in the first and second buffer memories.

3. The electronic device according to claim 1, wherein the second interface comprises a reader for a recording medium, and receives the third authentication information read from the recording medium.

4. The electronic device according to claim 1, wherein the second interface comprises a communication unit configured to communicate with another external electronic device connected by using a communication format different from a predetermined communication format of the first interface, and receives the third authentication information transmitted from the another external electronic device.

5. The electronic device according to claim 1, wherein the second interface comprises a radio signal receiver configured to receive the third authentication information transmitted from another external device by radio.

6. The electronic device according to claim 1, further comprising:
   a transmitter configured to transmit information to another external electronic device,
   wherein, when updating the first authentication information stored in the memory, the update control unit transmits the updated authentication information to the another external electronic device by using the transmitter.

7. A method performed by an electronic device for updating authentication information used for conducting authentication processing with an external electronic device connected via a data bus by using a predetermined communication format so as to establish a communication state with the external electronic device, said method comprising:
   storing first authentication information used for conducting authentication processing in a first memory;
   simultaneously storing second authentication information received via a first input path in a first buffer memory and third authentication information received via a second input path in a second buffer memory;
   setting a first flag in the first buffer memory in response to the storage of the second authentication information, and a second flag in the second buffer memory in response to the storage of the third authentication information;
   incrementing a first generation counter at the first buffer memory in response to the storage of the second authentication information, and a second generation counter at the second buffer memory in response to the storage of the third authentication information;
   comparing, by a central processing unit of the electronic device, when the first flag is set, the incremented value of the first generation counter against a previous value of the generation counter stored in the first buffer memory, and comparing a version of the second authentication information to a version of the stored first authentication information when the incremented value of the first generation counter is greater than the previous value of the generation counter stored in the first buffer memory;
   updating the first authentication information using the second authentication information when it is determined that the version of the second authentication information is newer than the first authentication information;
   comparing, by the central processing unit of the electronic device, when the second flag is set, the incremented value of the second generation counter against a previous value of the generation counter stored in the second buffer memory, and comparing a version of the third authentication information to a version of the stored first authentication information when the incremented value of the second generation counter is greater than the previous value of the generation counter stored in the second buffer memory; and
   updating the first authentication information using the third authentication information when it is determined that the version of the third authentication information is newer than the first authentication information.

8. The method according to claim 7, further comprising:
   checking validity of the content of the buffered second and third authentication information.

9. The method according to claim 7, wherein one of the first and second input paths is an input path into which one of the second and third authentication information read from a recording medium is input.

10. The method according to claim 7, wherein one of the first and second input paths is an input path to which one of the second and third authentication information is transmitted from another external electronic device connected by using a communication format different from the predetermined communication format.

11. The method according to claim 7, wherein one of the first and second input paths is an input path for receiving and inputting one of the second and third authentication information transmitted from another external electronic device by radio.

12. The method according to claim 7, wherein, when updating the first authentication information, the updated first authentication information is transmitted to another external electronic device.

* * * * *